US012710112B2

(12) United States Patent
Ks et al.

(10) Patent No.: US 12,710,112 B2
(45) Date of Patent: Aug. 18, 2026

(54) ANTI-CAVITATION AND NOISE REDUCTION TRIM IN ROTARY CONTROL VALVE

(71) Applicant: Bray International, Inc., Houston, TX (US)

(72) Inventors: Sarath Ks, Bengaluru (IN); Prasad Kumar, Bengaluru (IN); Pramod B Kumar, Bengaluru (IN); Mathew Varghese, Bengaluru (IN)

(73) Assignee: Bray International, Inc., Houston, TX (US)

( * ) Notice: Subject to any disclaimer, the term of this patent is extended or adjusted under 35 U.S.C. 154(b) by 35 days.

(21) Appl. No.: 19/028,010

(22) Filed: Jan. 17, 2025

(65) Prior Publication Data

US 2025/0237324 A1 Jul. 24, 2025

Related U.S. Application Data

(60) Provisional application No. 63/624,627, filed on Jan. 24, 2024.

(51) Int. Cl.
*F16K 47/04* (2006.01)
*F16K 5/06* (2006.01)

(52) U.S. Cl.
CPC .......... *F16K 47/045* (2013.01); *F16K 5/0605* (2013.01)

(58) Field of Classification Search
CPC ........ F16K 5/0605; F16K 5/12; F16K 47/045; F16K 47/08
See application file for complete search history.

(56) References Cited

U.S. PATENT DOCUMENTS 3,545,492 A * 12/1970 Scheid, Jr. ........ F16L 55/02718 138/44
4,007,908 A 2/1977 Smagghe et al.
(Continued)

FOREIGN PATENT DOCUMENTS

CN 202432002 U 9/2012
CN 202545873 U 11/2012
(Continued)

OTHER PUBLICATIONS

Machine English translation of CN-108302216-A (Year: 2026).*
(Continued)

*Primary Examiner* — Hailey K. Do
(74) *Attorney, Agent, or Firm* — Oathout Law Firm; Laura Tu; Mark A. Oathout

(57) ABSTRACT

The disclosure relates to a segmented ball valve for low noise and anti-cavitation applications, wherein a replaceable cartridge may be fixed inside and retained by stem and end post. The cartridge may incorporate irregular or regular polygonal-shaped plates or a combination of polygonal shaped plates and round bars facilitating staged pressure reduction and effectively mitigating or eliminating the occurrence of high-intensity cavitation and noise. The segment may have a precisely machined cylindrical bore designed to accommodate a slide-fit anti-cavitation and noise reduction cartridge; this allows for convenient field replaceability of the cartridge with minimal effort, eliminating the need for welding or fasteners to affix it to the segment. This cartridge may also facilitate the utilization of this fully cylindrical bore inside the segment for incorporating a greater number of pressure reduction stages compared to the currently available designs.

28 Claims, 23 Drawing Sheets

(56) References Cited

U.S. PATENT DOCUMENTS

| | | | | |
|---|---|---|---|---|
| 4,085,774 | A | 4/1978 | Baumann | |
| 4,212,321 | A * | 7/1980 | Hulsey | F16K 47/045 251/127 |
| 4,479,510 | A | 10/1984 | Bey | |
| 5,070,909 | A | 12/1991 | Davenport | |
| 5,180,139 | A | 1/1993 | Gethmann et al. | |
| 5,193,583 | A | 3/1993 | Gethmann et al. | |
| 5,218,984 | A | 6/1993 | Allen | |
| 5,332,004 | A | 7/1994 | Gethmann et al. | |
| 5,772,178 | A | 6/1998 | Bey | |
| 6,520,209 | B1 | 2/2003 | Lundqvist | |
| 6,675,832 | B1 * | 1/2004 | Tran | F16K 47/045 251/368 |
| 8,141,843 | B2 | 3/2012 | Rimboym et al. | |
| 8,366,070 | B2 | 2/2013 | Rimboym et al. | |
| 8,641,264 | B2 * | 2/2014 | Sawada | B01F 25/50 366/605 |
| 10,100,947 | B2 | 10/2018 | Gattavari | |
| 10,221,963 | B2 | 3/2019 | Eilers et al. | |
| 10,480,683 | B2 | 11/2019 | Kuitunen et al. | |
| 11,242,942 | B2 * | 2/2022 | McMahon | F16K 1/06 |
| 11,698,148 | B1 | 7/2023 | Eilers | |
| 11,906,076 | B2 | 2/2024 | Freitas et al. | |
| 2020/0248838 | A1 * | 8/2020 | Anandbabu | F16L 58/00 |
| 2021/0207740 | A1 | 7/2021 | Watson et al. | |
| 2022/0154849 | A1 | 5/2022 | Jablonski | |
| 2024/0003435 | A1 | 1/2024 | Bonsi et al. | |

FOREIGN PATENT DOCUMENTS

| | | | | |
|---|---|---|---|---|
| CN | 108302216 | A * | 7/2018 | F16K 5/0605 |
| CN | 208041202 | U | 11/2018 | |
| CN | 110259977 | A | 9/2019 | |
| EE | 00497 | U1 | 1/2005 | |
| RU | 2327920 | C1 | 6/2008 | |
| RU | 209328 | U1 | 3/2022 | |
| WO | 2022118134 | A1 | 6/2022 | |

OTHER PUBLICATIONS

Lanel, Francois, PCT International Search Report & Written Opinion of the International Searching Authority for PCT/US2025/012014, Apr. 30, 2025, 15 pages, European Patent Office, Rijswijk, the Netherlands.

International Electrotechnical Commission, International Standard IEC 60534-8-3 Industrial-process control valves—Part 8-3: Noise considerations—Control valve aerodynamic noise prediction method, Nov. 1, 2010, 100 pages, International Electrotechnical Commission, Geneva, Switzerland.

Ceuca, Antonio, PCT Written Opinion of the International Searching Authority for PCT/US2023/070930, Nov. 10, 2023, 4 pages, European Patent Office, Rijswijk, Netherlands.

Ceuca, Antonio, PCT International Search Report for PCT/US2023/070930, Nov. 10, 2023, 8 pages, European Patent Office, Rijswijk, Netherlands.

Emerson Process Management, Fisher® Vee-Ball (TM) V150, V200, and V300 Noise Attenuator, Jan. 1, 2013, 4 pages, Emerson Process Management, Marshalltown, IA, United States of America.

Emerson Electric Co., Fisher (TM) Cavitrol (TM) Hex Trim, snapshot taken of Mar. 6, 2023 webpage at Internet Wayback Machine https://web.archive.org/web/20230306085846/https://www.emerson.com/en-us/catalog/fisher-cavitrol-hex-trim, Mar. 6, 2023, 1 page, United States of America.

Emerson Electric Co., Fisher (TM) Whisper (TM) NXV Trim, snapshot taken of Nov. 5, 2023 webpage at Internet Wayback Machine https://web.archive.org/web/20231105224452/https://www.emerson.com/en-us/catalog/fisher-nxv, Nov. 5, 2023, 2 pages, United States of America.

Flowserve, NAF® Setball Ball Sector Valves, Aug. 2023, 20 pages, Flowserve Corporation, Irving, TX, United States of America.

Flowserve, NAF Product Overview, 2014, 2 pages, Flowserve Corporation, Irving, TX, United States of America.

Metso Automation Inc., Metso Q2 Trim—Stop noise before its born, Jun. 2013, 4 pages, Metso Automation Inc., Finland.

Metso, Neles Q-Ball® Quiet Metal Seated Control Ball Valve, Oct. 2012, 2 pages, Metso Flow Control Inc., Finland.

Flowserve, Flowserve Cavitation Control, Jan. 2009, 20 pages, Flowserve Corporation, Irving, TX, United States of America.

* cited by examiner

ANTI-CAVITATION AND NOISE REDUCTION TRIM IN ROTARY CONTROL VALVE

BACKGROUND

Technical field: Segmented ball valves are designed for the precise control of gas, steam, liquids, and fibrous slurries. A common challenge encountered in control valves involves cavitation and noise during the pressure reduction from upstream to downstream conditions as required by the process requirements. Conventional prior segmented ball valves incorporate specialized features to mitigate cavitation and noise during their operation by using special trims welded to the segment.

Segmented ball valves are commonly used control valves for various liquids and gases which generates high noise in the process. Noise is reduced by introducing noise attenuators on the segment which distributes the pressure drop into multiple stages and absorbs energy thereby reducing the noise. The valve is operated by positioning the segment at the required opening to attain a particular process condition. The noise attenuator on the segment provides maximum restriction at lower openings working at high pressure drops and least restriction at higher openings working at low pressure drops.

Cavitation is a liquid phenomenon of formation of vapor bubbles where the pressure of the liquid falls below its vapor pressure and collapsing of these bubbles in the higher-pressure region. Cavitation too often produces high level noise and vibration.

Conventional segmented ball valves are characterized by a single-piece body construction. During assembly, the segment which is larger than the body bore requires precise alignment for insertion through the segment entry bore of the body. Once inside, the segment must be rotated within the spherical cavity of the body to achieve the correct position. The inclusion of anti-cavitation or noise trim, or noise attenuators, welded onto the segment, adds to its overall size, presenting challenges during assembly into the body. This limitation impacts the number and size of plates that can be incorporated into the cavitation or noise trim, resulting in suboptimal trim or attenuator performance. Moreover, any modifications to the cavitation or noise trim or attenuator design on-site due to changes in process conditions would mandate the replacement of the entire segment, necessitating a repetition of the hydro seat test.

Conventional or typical anti-cavitation and noise trims or attenuators in rotary ball valves often employ straight plates that are welded onto the segment. However, these conventional trims and attenuators lack the ability to generate an expanding flow or non-impinging jet streams in its flow profile. Ideally, anti-cavitation trims should be able to generate cyclic flow expansion and flow contraction; however, many conventional trims fail to do so. Consequently, the performance of such trim or attenuator configurations is suboptimal in preventing cavitation and high noise.

Segmented ball valves are needed for many applications due to its specific features. The industry requires a solution that effectively mitigates or eliminates cavitation and noise. Accordingly, there is a need for a segmented ball valve which can optimize the efficient reduction of cavitation and noise, generate cyclic flow expansion and flow contraction, and offer the convenience of on-site replacement of cavitation and noise-reducing components with minimal effort.

BRIEF SUMMARY

Exemplary embodiments disclosed herein relate to various features in the segmented ball valves to reduce noise and cavitation more efficiently, generate cyclic flow expansion and flow contraction, and provide the flexibility to replace the noise reducing features within the valve at site with minimum effort.

Usage of the terms "linkages", "links", "elements", "connectors" or "bars" herein may also encompass "plates" or "rods", having any cross section shapes which are regular polygonal, irregular polygonal, circular, or ovoid, and which link or connect a first end of the interior surface of a low noise and anti-cavitation cartridge to a second end of the interior surface of the low noise and anti-cavitation cartridge.

The disclosure relates to a segmented ball for reducing noise and/or cavitation for a media flow having a flow direction from upstream to downstream in a rotary control valve, comprising a cartridge body replaceably inserted into the segmented ball; and/or a first plurality of linkages arranged into a plurality of rows of linkages, wherein each of the first plurality of linkages connects a top half of the cartridge body to a bottom half of the cartridge body, and/or wherein the each of the first plurality of linkages is orthogonal to a longitudinal axis of the cartridge; and/or wherein each of the plurality of rows of linkages within the cartridge body is offset from an adjacent downstream row of linkages within the cartridge body; and/or a first flow area defined between each of the plurality of rows of linkages; and/or a second flow area defined between each of linkages within the adjacent downstream row of linkages, and/or wherein the first flow area is of a different size than the second flow area; and/or wherein a first cross section of each linkage of the plurality of the rows of linkages is larger in area than a second cross section of each linkage of the adjacent downstream row of linkages; and/or wherein the first cross section and/or second cross section each comprise a polygon shape defining a flow facing edge configured to bifurcate the media flow at the flow facing edge; and/or further comprising entry plates on an upstream end of the cartridge body; and/or further comprising exit plates towards a downstream end of the cartridge body; and/or wherein the entry plates and/or exit plates are angled in order to guide the media flow; and/or wherein the and/or exit plates are angled to converge the media flow towards a central plane; and/or wherein the exit plates terminate a distance from the downstream end of the cartridge body and/or within the cartridge body; and/or wherein the first cross section and/or second cross section each comprise a circular shape configured to bifurcate the media flow at an upstream end of the circular shape; and/or further comprising a second plurality of linkages connecting a front of the cartridge to a rear of the cartridge, and/or wherein the second plurality of linkages is orthogonal to the longitudinal axis of the cartridge and/or also orthogonal to the first plurality of linkages; and/or wherein the first flow area is larger than the second flow area; and/or wherein the first flow area is smaller than the second flow area; and/or wherein a first cross section of each linkage of the plurality of the rows of linkages is identical in size to a second cross section of each linkage of the adjacent downstream row of linkages; and/or wherein each of the first plurality of linkages further comprises a plurality of protrusions orthogonal to and/or on each of the first plurality of linkages; and/or wherein the plurality of protrusions are set at a same distance from each other on each of the first plurality of linkages at a downstream end of the cartridge body compared to the plurality of protrusions on each of the first plurality of linkages at an upstream end of the cartridge body; and/or further comprising a plurality of offset compartments defined by the first plurality of linkages and/or the plurality of protrusions.

The disclosure also relates to a method for obtaining a gradual pressure drop in a rotary control valve, comprising the steps of providing a segmented ball; and/or inserting a cartridge into a closely fitting internal cavity defined within the segmented ball; and/or wherein the cartridge comprises a plurality of linkages orthogonal to a flow direction of the rotary control valve in a fully opened position; and/or wherein the plurality of linkages is arranged into a plurality of rows of linkages; and/or wherein each of the plurality of row of linkages is offset from a downstream row of linkages; and/or inducing a pressure dropping stage between each of the plurality of rows of linkages; and/or expanding a fluid flow and/or contracting the fluid flow within the pressure dropping stage; and/or preventing a pressure of the fluid flow from dropping below a vapor pressure of the fluid flow; and/or contracting the fluid flow between the each of the plurality of linkages; and/or expanding the fluid flow between each of the plurality of linkages and/or replacing the cartridge without replacing the segmented ball.

The disclosure further relate to a cartridge trim for closely fitting, removing, and/or replacing within a segmented ball of a rotary valve, having an upstream end and a downstream end, and/or a top half for connecting to a top stem, and/or a bottom half for connecting to a bottom stem, and/or configured for reducing and/or mitigating noise and/or cavitation of a fluid flow, comprising a first set of rows of linkages extending from the top half to the bottom half within the cartridge; and/or wherein each subsequent downstream row of the first set of rows of linkages comprises linkages of decreasing size compared to each prior row of the first set of rows of linkages; and/or each subsequent downstream row of the first set of rows of linkages is offset from the prior row the first set of rows of linkages via displacement from a front of the cartridge; and/or wherein a first row of the first set of rows of linkages is nearer the upstream end and/or a last row of the first set of rows of linkages is nearer the downstream end; and/or wherein the cartridge defines a flow area at the upstream end and/or a flow area at the downstream end, and/or wherein the flow area at the downstream end is greater than the upstream end; and/or wherein the flow area at the upstream end is defined by an area around the first set of rows of linkages at the upstream end and/or between the linkages of the first set of rows of linkages at the upstream end; and/or wherein the flow area at the downstream end is defined by an area around the first set of rows of linkages at the downstream end and/or between the linkages of the first set of rows of linkages at the downstream end; and/or a second set of rows of linkages extending from a front of the cartridge to a rear of the cartridge, wherein the second set of rows of linkages is orthogonal to the first set of rows of linkages and/or also orthogonal to the fluid flow when the cartridge is in a fully opened position.

BRIEF DESCRIPTION OF THE DRAWINGS

The embodiments may be better understood, and numerous objects, features, and advantages made apparent to those skilled in the art by referencing the accompanying drawings. These drawings are used to illustrate only typical embodiments of this disclosure, and are not to be considered limiting of its scope, for the disclosure may admit to other equally effective embodiments. The figures are not necessarily to scale and certain features and certain views of the figures may be shown exaggerated in scale or in schematic in the interest of clarity and conciseness.

DETAILED DESCRIPTION OF THE EMBODIMENT(S) SHOWN

The description that follows includes exemplary apparatus, methods, techniques, and instruction sequences that embody techniques of the inventive subject matter. However, it is understood that the described embodiments may be practiced without these specific details.

Figure 1:
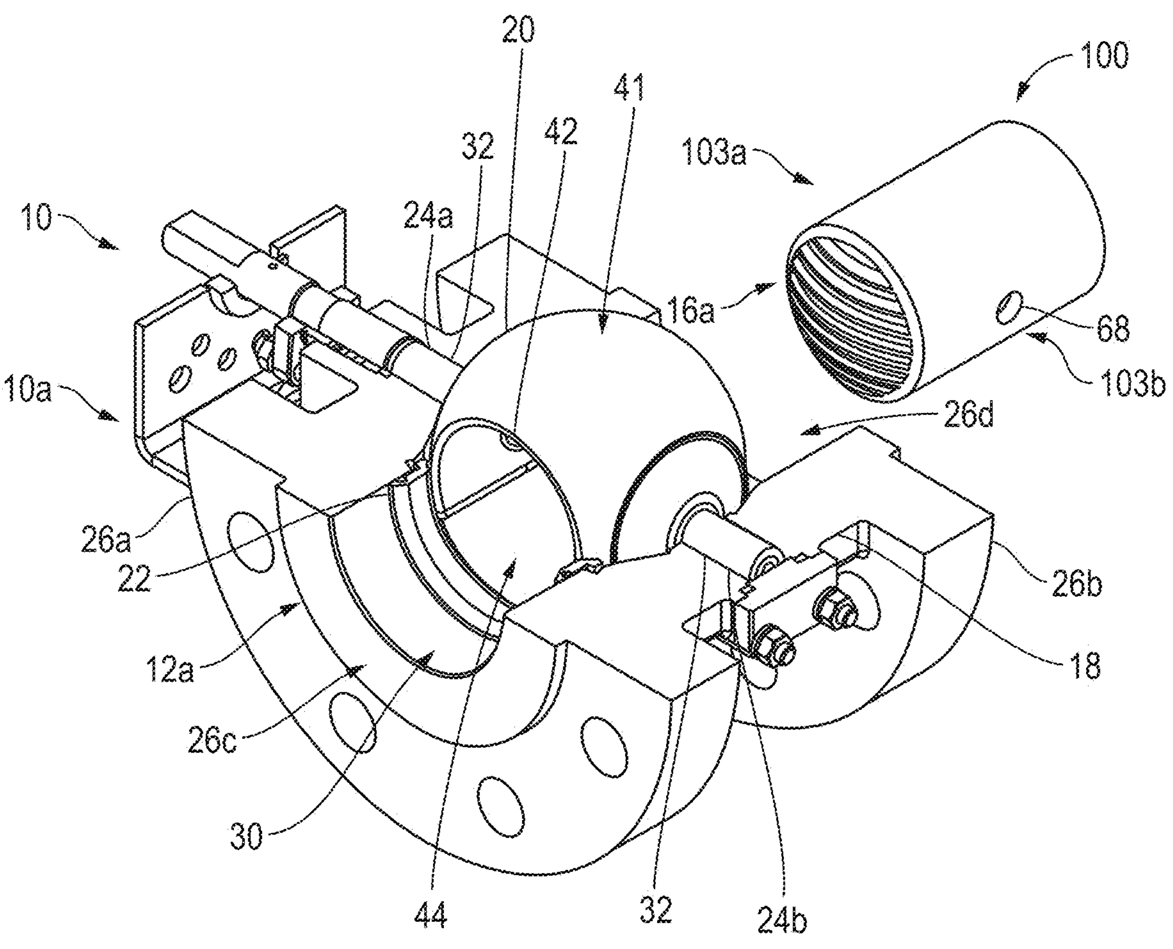
FIG. 1 depicts a perspective view partially in cross section of a segmented rotary control valve shown in an exemplary embodiment during assembly, disassembly, or replacement of an exemplary embodiment of a cartridge for anti-cavitation and low noise.
Figure 2:
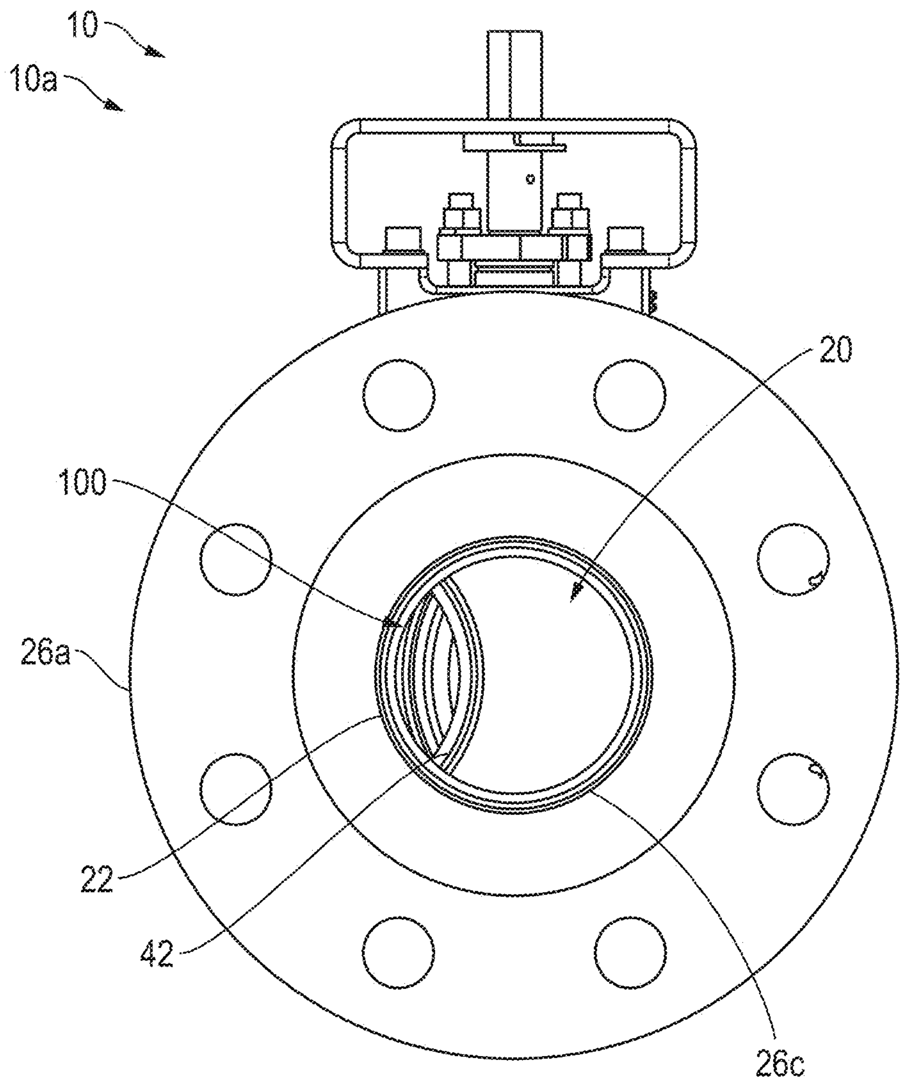
FIG. 2 depicts a side view of a segmented rotary control valve shown in one modulating position in an exemplary embodiment.

FIG. 1 depicts a perspective view partially in cross section of a segmented rotary control valve 10 shown in the exemplary embodiment of a segmented ball valve 10*a*. The valve 10 or 10*a* is shown in an exemplary embodiment during assembly, disassembly, or replacement of an exemplary embodiment of a cartridge 100 for anti-cavitation and low noise. FIG. 2 depicts a front view of a segmented rotary control valve 10 shown in one modulating position in an exemplary embodiment. The modulating position is a partially open position of the rotary control valve 10 which allows an upstream flow path 12*a* through the segmented valve 10*a* through to the downstream flow path 16*a*. In the presently described embodiments, the rotary control valve 10 and segmented valve 10*a* is a unidirectional valve having an upstream flow path 12*a* and a downstream flow path 16*a* through the cartridge 100. It is to be noted that the segmented rotary control valve 10, is not usually fully closed and neither is it usually fully open wherein the direction of flow is one direction. Rather the segmented rotary control valve 10 is normally modulating between a variety of positions there-between a fully closed position and a fully open position.

The segmented rotary control valve 10 may have a valve body 18, a segmented ball 20, a valve seat 22, upper valve stem 24*a* and lower valve stem 24*b*, and two connector ends 26*a*, 26*b*. Connector end 26*a* defines a relatively smaller diameter opening 26*c* to the valve body 18, and consequently flow path 30, relative to connector end 26*b* which defines a relatively larger diameter opening 26*d* to the valve body 18 and consequently flow path 30.

In the closed position, the segmented ball 20 is rotated thereby sealing the upstream flow path(s) 12*a* with a solid portion of the segmented ball 20 against the valve seat 22. In the open position, achieved via rotation of the segmented ball 20, an aperture 30 defined by the valve body 18 allows fluids to flow through the segmented ball valve 10*a* via the upstream flow path(s) 12*a*. The upper valve stem 24*a* and lower valve stem 24*b* may penetrate the valve body 18 through an access way 32 in the valve body 18. An actuator (not shown) may couple to the upper valve stem 24*a* in order to actuate the segment ball 20 between a variety of open positions and the closed position. The connector ends 26 as shown are configured for connection to piping (not shown). The connector ends 26 may be any suitable connection including, but not limited to, welding, butt welds, socket welds, bolt on flanges, and the like.

The segmented ball 20 includes a front side or profile 41 that is facing or opposing the upstream flow path 12*a* when the segmented ball 20 is in the closed position. The segmented ball 20 defines an internal hollow, chamber, or cavity such as a precision machined cylindrical bore 42 on the back side 44 of the segmented ball 20. The internal cavity 42 is adapted for receiving or to fit-in a replaceable low noise and anti-cavitation cartridge 100 within the segmented ball 20. The cavity 42 passes entirely through the segmented ball 20.

Referring to the exemplary embodiments of FIG. 1 the segmented rotary control valve 10 is assembled or disassembled with the upper stem 24*a* and the lower stem 24*b* pushed or pulled through the segmented rotary control valve 10 and the segmented ball 20, and wholly pushed or pulled out of the cartridge 100 to enable respective assembly, disassembly, and replaceability of cartridge 100 (by contrast in the prior art there is a great deal of difficulty, due to interference, of assembling a fully welded/integrated type noise attenuator into a valve without a cartridge 100). It is to be noted that the upper stem 24*a* and the lower stem 24*b* will remain in the segmented ball 20 during the assembly or disassembly of the cartridge 100, and hence the segmented ball 20 shall remain in place within the segmented rotary control valve 10 during the assembly, disassembly, and/or replacement of the cartridge 100. The upper and lower stems 24*a*, 24*b* may be pulled out slightly to facilitate the assembly of the cartridge 100 into the valve 10. The cartridge 100 of FIG. 1 is inserted through the valve 10 downstream bore 26*d* into the closely fitting internal passage or cylindrical bore 42 of the segmented ball 20 kept in the fully open position. In one exemplary embodiment the close fit may be defined as a H7/g6 clearance or fit. The cartridge 100 may be locked within the segmented ball 20 as follows: the upper stem 24*a* and the lower stem 24*b* are then inserted into the final position via slots 64 and 68 through the cartridge body 62 to firmly secure and/or anchor the cartridge 100 in place through and within the segmented ball 20 and the valve body 18. The upper stem 24*a* and the lower stem 24*b* do not pass through the cartridge 100 but each preferably terminates at one end within the wall of the cartridge body 105. The downstream opening of the valve body 18, as adjacent to the segmented ball 20, may optionally include a liner (not shown) for protecting the valve body 18. The liner may act as a protection for residual cavitation, if any.

The segmented ball valve 10*a* specifically engineered for anti-cavitation and noise reduction purpose uses a replaceable and removable cartridge 100 which is securely positioned within the segmented ball 20, and held in place by the stem 24*a* and end post 24*b*. The cartridge 100 incorporates linkages or bars 120, which may be irregular or regular polygonal-shaped plates 130 or a combination of polygonal shaped plates 130 and round bars or rods 140 (see rods 140 in, e.g. FIGS. 18-22) facilitating staged pressure reduction and effectively mitigating or eliminating the occurrence of high-intensity cavitation and noise. The segmented ball 20 has a precisely machined cylindrical bore 42 designed to accommodate a slide-fit anti-cavitation and noise reduction cartridge 100; this allows for convenient field replaceability of the cartridge 100 with minimal effort and eliminates the need for any welding or fasteners to affix the cartridge 100 to the segmented ball 20. This cartridge 100 also facilitates the utilization of the fully cylindrical bore 42 inside the segmented ball 20 for incorporating a greater number of pressure reduction stages 110 compared to the currently available or conventional designs.

As mentioned before, unlike the conventional cavitation and noise reduction trims, in the present embodiments, a cartridge 100 trim is introduced onto the segmented ball 20 without the help of welding or fasteners. This cartridge 100 trim can split the pressure drop across multiple pressure reduction stages 110 and absorb kinetic energy ensuring the pressure at any stage 110 will not drop below the vapor pressure of the fluid, which is a key factor in cavitation. The cartridge 100 is intended to be used for a unidirectional flow path from upstream 12*a* to downstream 16*a*, and can be modulated or used in any number of partially open positions (see, e.g., FIG. 2) between the fully opened and fully closed positions.

Conventional segmented ball valves can exhibit notably low liquid pressure recovery factor (hereinafter, also referred to as "FL") values, which leads to the occurrence of cavitation even in low pressure drop applications. However, the incorporation of anti-cavitation cartridge 100 trim has the potential to elevate the FL value closer to 1. Thus the cartridge 100 is enabled to handle high-pressure drops without having cavitation issues. Additionally, an increase in the number of flow paths results in a reduction in valve style modifier, or $F_d$, values, leading to decreased noise levels. Effective mitigation or elimination of cavitation and noise of the present exemplary embodiments of cartridges 100 can be achieved by incorporating a higher number of pressure-reducing stages 110, thus intermixing of internal jet streams 113.

The segmented ball valve 10*a* or rotary control valve 10 utilizes a precisely machined cylindrical bore 42 of the segmented ball 20 to accommodate the interchangeable anti-cavitation and noise cartridge 100. The cartridge 100 consists of linkages, or bars 120, which may include irregular or regular polygonal-shaped plates 130 and/or rods 140, oriented perpendicular or orthogonal to the unidirectional flow direction from upstream flow path 12*a* to downstream flow path 16*a*. These linkages, or bars 120, including irregular or regular polygonal-shaped plates 130 and/or rods 140, effectively alter the flow direction from one stage 110 to another stage 110 and inducing pressure drops through expansion 112 and contraction 111 cycles.

Figure 3:
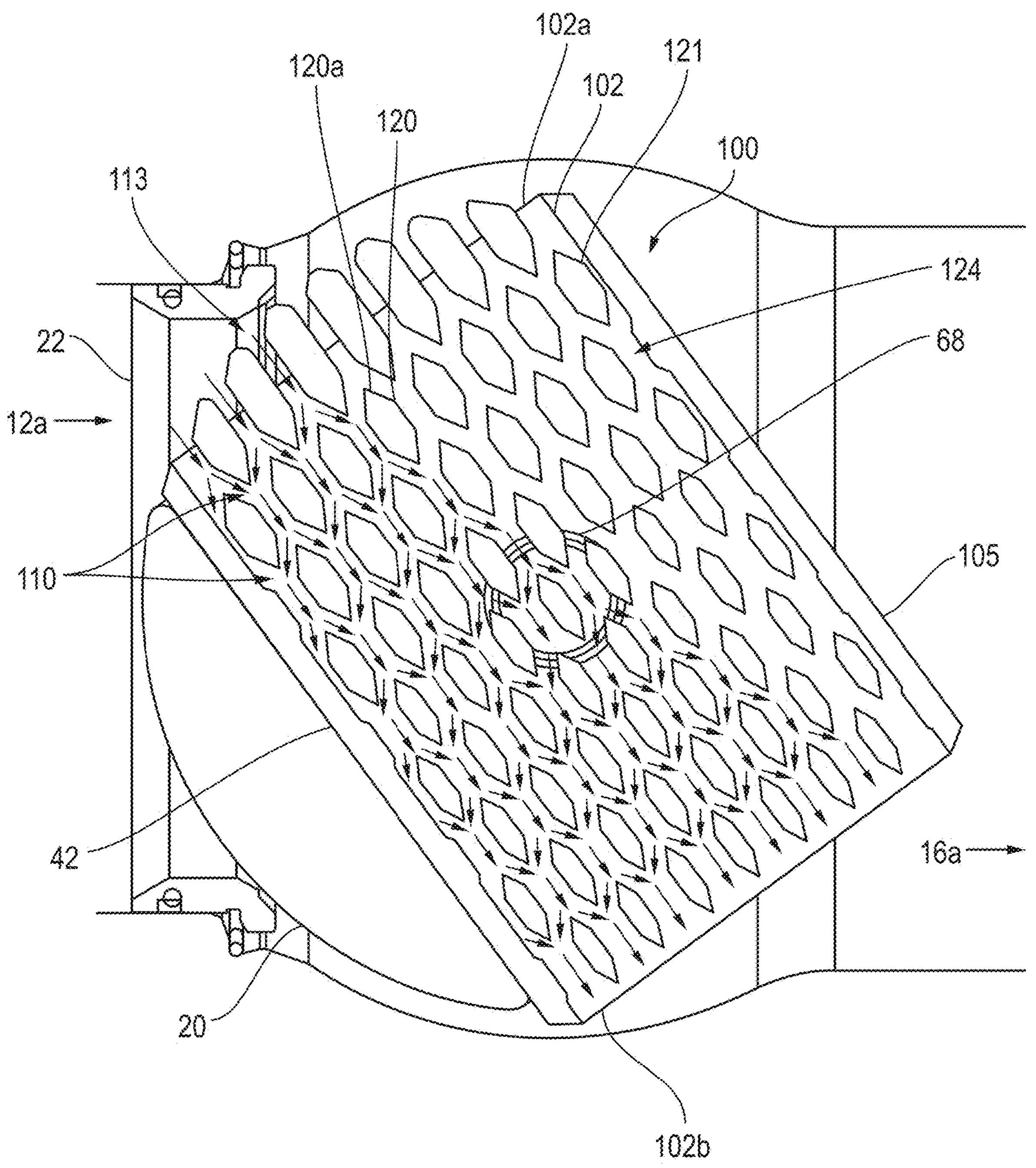
FIG. 3 depicts a top view of the cross section of an exemplary embodiment of a segmented rotary control valve with an exemplary embodiment of a cartridge for anti-cavitation and low noise shown in one modulating or partially opened position.
Figure 4:
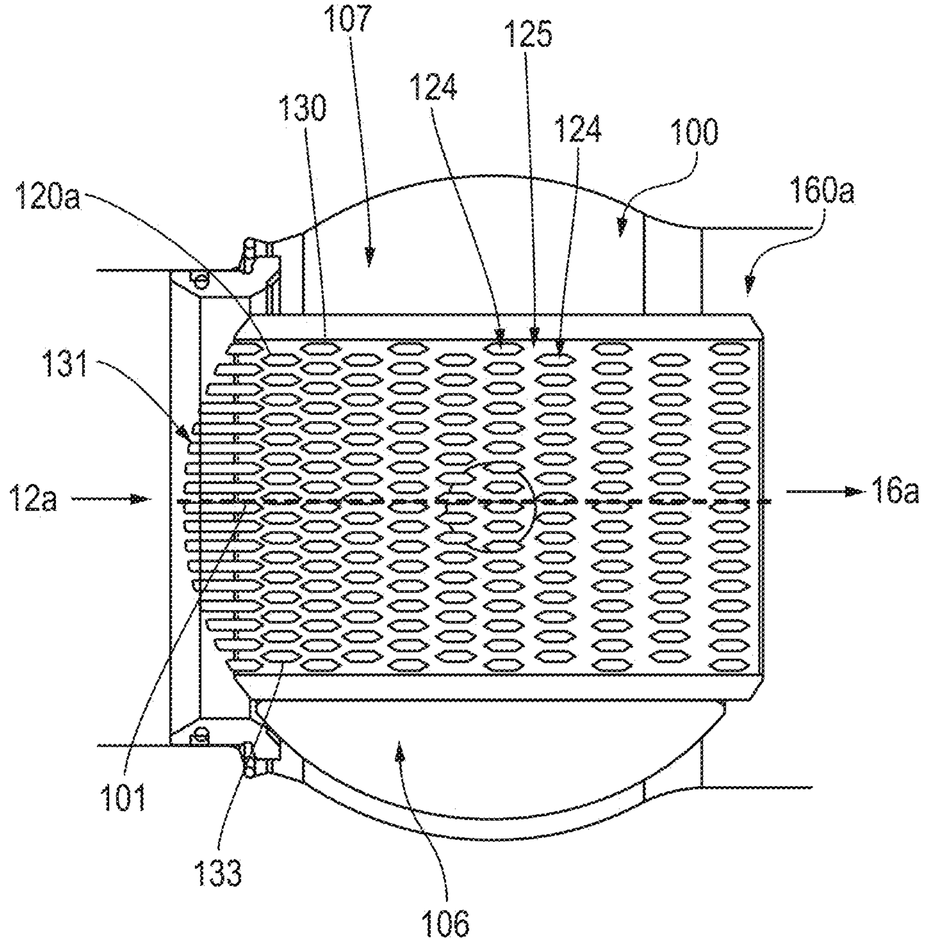
FIG. 4 depicts a top view of the cross section of an exemplary embodiment of a segmented rotary control valve with an exemplary embodiment of a cartridge for anti-cavitation and low noise shown in a fully opened position.
Figure 5:
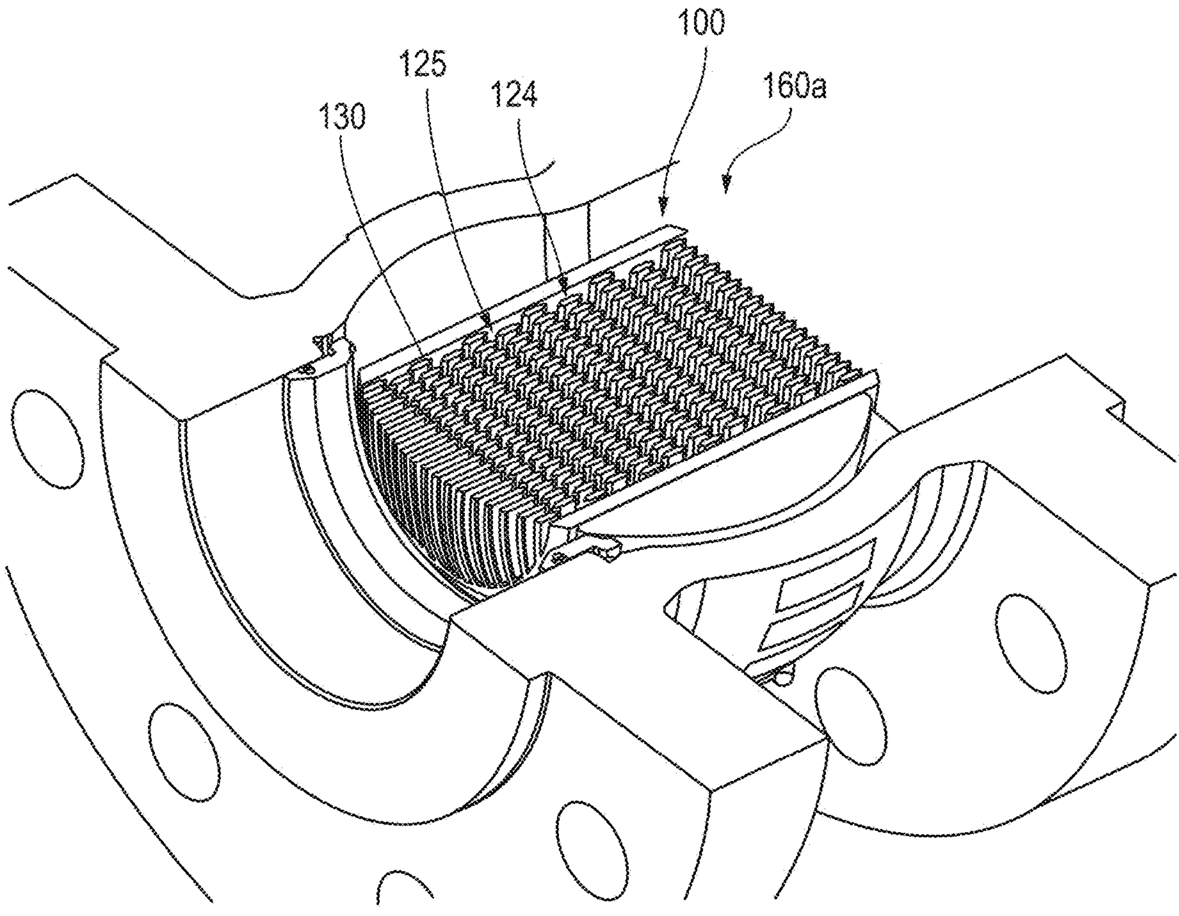
FIG. 5 depicts a perspective view of the cross section of the exemplary embodiments of the segmented rotary control valve and cartridge for anti-cavitation and low noise as shown in FIG. 4.

Referring further to FIGS. 3-4, which show the segmented rotary control valve 10 and cartridge 100 in a modulating or partially opened position, and a fully opened position, respectively, the low noise and anti-cavitation cartridge 100 has a substantially cylindrical or tubular body 105 about or along a longitudinal axis 101, configured to fit within the precision machined bore 42 of the segmented ball 20, wherein the cartridge 100 is configured to reduce and/or eliminate and/or mitigate noise and cavitation for a flow or jet stream 113. The FIG. 5 depicts the exemplary embodiment of the cartridge 100 of FIG. 4 in a fully opened position of the valve 10. The cartridge body 105 defines a substantially cylindrical, tubular, or pipe-like inner surface 102, and further defines a first or upstream edge, end, or opening 102*a* and a second or downstream edge, end or opening 102*b*. The cartridge body 105 further defines a top half semi-cylinder 103*a*, wherein the upper stem 24*a* may be inserted into the slot 64 of the cartridge 100, and a bottom half semi-cylinder 103*b*, wherein the bottom stem 24*b* may be inserted into slot 68 of the cartridge 100, (and as can be seen in FIG. 1 and partially in FIG. 3).

The linkages 120*a* are positioned orthogonal to the unidirectional flow direction from upstream 12*a* to downstream 16*a* when the valve 10 is in a fully open position (see, e.g. FIG. 4); the linkages 120*a* thus connect the top half semi-cylinder 103*a* of the cartridge body 105 at a first end of the linkage 120*a*, to the bottom half semi-cylinder 103*b* of the cartridge body 105 at a second end of the linkage 120*a*. These orthogonal linkages 120*a* are arranged in a number or multiple of rows or groups 124, wherein the first row 124 is towards an upstream end 102*a* of the cartridge 100, and the last row is towards the downstream end 102*b* of the cartridge 100. The first linkage 120*a* within each row 124 is at or towards a front 106 of the cartridge body 105, and the last linkage 120*a* of the row 124 is towards a rear 107 of the cartridge body 105; and further wherein the linkages 120*a* in each subsequent downstream row 124 are offset, unaligned, or non-parallel from the position of the linkages 120*a* in the prior, upstream row 124. By way of example only, the first of the linkages 120*a* in a downstream or subsequent row 124 may be shifted closer or farther away towards the front 106 than the first of the linkages 120*a* in a prior, upstream, or earlier row 124.

Figure 6:
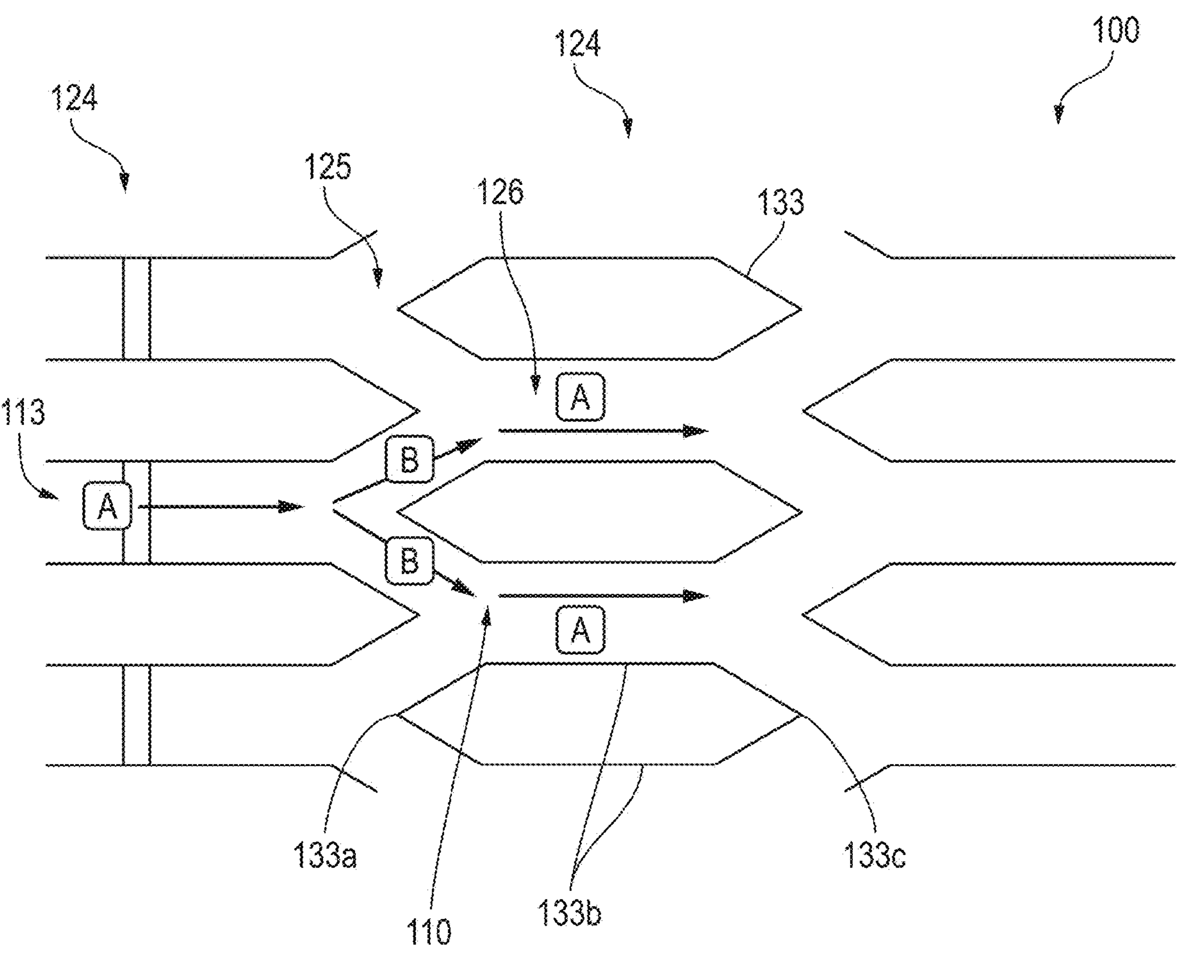
FIG. 6 depicts an enlarged view of the cross section of the linkages or plates of an exemplary embodiment of the cartridge for anti-cavitation and low noise and an exemplary embodiment of a jet stream flowing through the linkages.

FIGS. 3-6 depict various cross section views of a cartridge 100, including an enlarged cross section view in FIG. 6, which shows the details of the linkages 120, in particular the plates 130 of the exemplary embodiment of the cartridge 100 or 160*a*. Each linkage 120, 120*a* or plate 130 or rod 140 has a cross section 121. In the exemplary embodiments of the cartridge 160*a* (and also cartridges 160*b*, 160*c*, and 160*d* of FIGS. 9-17) each plate 130 has a polygonal cross section 133 which includes a flow facing edge 133*a*, and a non-flow facing edge 133*c*. The flow facing edge 133*a* and non-flow facing edge 133*c* are connected by parallel faces 133*b*. Parallel faces 133*b* can be parallel to the longitudinal axis 101 of the trim 100 or the parallel faces 133*b* can be at an angle with respect to the longitudinal axis 101 of the trim 100. The flow facing edge 133*a* of the plate 130 may play a crucial role in inducing stream 113 bifurcation, as later described herein and the faces of the flow facing edge 133*a* may have a preferred angle in the range of 30 degrees to 120 degrees in certain exemplary embodiments. The cartridge 160*a* may also include straight entry linkages or plates 131 set or positioned at the upstream end 102*a* which guide the jet stream or flow 113 into the cartridge 160*a* interior. In an alternative exemplary embodiment, the cartridge 160*a* may also optionally, instead or further, include straight exit linkages or plates (not shown) set or positioned at the downstream end 102*b* which guide the jet stream or flow 113 out of the cartridge 160*a*.

A number of areas 125 are defined between each row 124 of linkages 120, 120*a*, or plates 130, which allows the stream 113 to intermix and drop the pressure below cavitation pressure levels at the pressure dropping stage 110. Areas 126 are also defined between each linkage 120, 120*a*, or plate 130 in a row 124, and between the linkages 120, 120*a* or plates 130 and the interior surface 102 of the cartridge body 105. The interfaces or intermixing areas between the flow area 125 and flow area 126 are the pressure dropping stages 110. While the exemplary embodiments of the cartridges 160*a* as depicted in FIGS. 4-5, show ten (10) rows 124 of linkages 120, 120*a* or plates 130, thus having nine (9) pressure dropping stages 110, a greater or fewer number of rows 124 and pressure dropping stages 110 are encompassed within the present disclosure. Conventional or currently known segmented balls are unable to achieve the number of pressure dropping stages 110 as disclosed herein. The flow or stream 113 may enter into the cartridge 100 from the upstream end 102*a* into a first area 125, and then is bifurcated into a downstream area 126; each area 126 then flows into each subsequent or downstream area 125. Additionally, each subsequent or downstream area 125 may be increased in size or same in size compared to earlier, prior or upstream area 125. Likewise, each row 124 of areas 126 may be increased in size or same in size compared to earlier, prior or upstream areas 126. In other words, subsequent rows 124 of linkages 120 may be set an increasingly farther distance from earlier upstream rows 124 of linkages 120, and the area 126 between each linkage 120 may increase in each subsequent downstream row 124; thus each link 120, 120*a* or plate 130 (or rod 14) has greater flow areas 125, 126 around said link 120 the further downstream in the cartridge 100 that the link 120 is located. The increase in flow areas 125, 126 around each link 120 may be aided by a shrinking or decrease of the size or cross section area 121 of the link 120 itself the farther downstream of the cartridge 100 that the link 120 is situated when the flow area 125 is larger than the flow area 126—this may be seen, by way of example, in at least FIG. 4. The exemplary embodiment of the cartridge 160*a* as depicted in and described for FIGS. 4-5 may be the preferred exemplary embodiment. However, in alternative exemplary embodiments, such as shown in at least FIG. 8, when the flow area 125 is smaller than the flow area 126, the cross section 121 size of linkages 120 (or plates 130 or rods 14) are same or identical across all the plurality of rows 124.

The exemplary embodiments of the cartridges 100, 160*a*-160*f* disclosed herein optimize and adjust the flow coefficient, or Cv, via at least, adjusting the number of pressure dropping stages 110, which is one of several variables related to the flow coefficient Cv. By way of example only, as the number of pressure dropping stages 110 increase, the flow coefficient Cv is expected to decrease; conversely, as the number of pressure dropping stages 110 decrease, the flow coefficient Cv is expected to increase. The area or spacing 125 between the rows 124 and the stages 110 is another variable which can be adjusted in the disclosed cartridges 100 that can affect the flow coefficient Cv.

Figure 7:
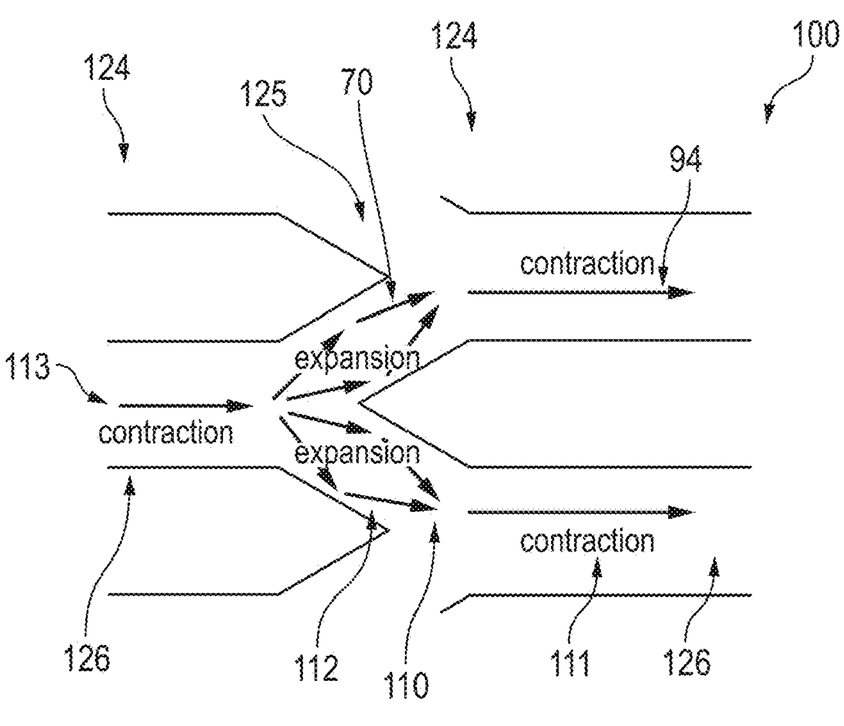
FIG. 7 depicts an enlarged view of the cross section of the linkages or plates of an exemplary embodiment of the cartridge for anti-cavitation and low noise and an exemplary embodiment of a jet stream flowing through the linkages.

Referring to FIG. 6, the initial flow or jet stream 113, upon entering the upstream end 102*a*, traverses a singular channel [A] before bifurcating into two distinct paths [B]. Cycles of expansion 112 and contraction 111 can be induced through two different processes and alternative exemplary embodiments as depicted in and described for FIGS. 7 and 8. In FIG. 7, the area between the rows 125, has a larger flow area [B] than the area 126 between adjacent linkages 120 within rows 124, which has a narrower flow area [A]. In comparison, in FIG. 8, the area 125 between the rows 124, has a smaller or narrower flow area [B] than the area 126 between adjacent linkages 120 within the rows 124, which has a larger flow area [A]. Accordingly, when the stream 113 enters into a narrower flow area the stream 113 will contract or undergo a contraction phase 111 and become converging or impinging jet streams 94 in the narrowed flow area. When the stream 113 enters into a larger flow area, the stream 113 will expand or undergo an expansion phase 112 and become non-impinging jet streams 70 in the larger flow area. Notably, the exemplary embodiments of the linkages 120 and areas 125, 126 and stages 110 as depicted and described for FIGS. 7 and 8 both have anti-cavitation and noise reduction capabilities.

In the preferred exemplary embodiment as shown in FIG. 7, the initial flow 113 undergoes expansion 112 as the flow 113 bifurcates into two streams at the area 125 between rows 124. The stream 113 experiences expansion and becomes non-impinging streams 70 in the area 125, which in FIG. 7 is an expansion flow area 112. Then, moving downstream, the non-impinging streams 70 become converging streams 94 as the stream 113 enters the contraction flow area 111 (in area 126 defined between the linkages 120 in each row 124). The flow area 126, in the exemplary embodiment of FIG. 7 consistently falls below the combined flow area 125. The flow area 125 remains constant across the trim or cartridge 100, while the flow area 126 gradually increases, leading to a cyclic pattern of expansion 112 and contraction 111 that results in staged pressure reduction at each subsequent pressure dropping stage 110. The cartridge 100 facilitates the mixing of jet streams 113 from different flow paths, contributing to the dissipation of additional energy within the valve 10 and/or cartridge 100.

Figure 8:
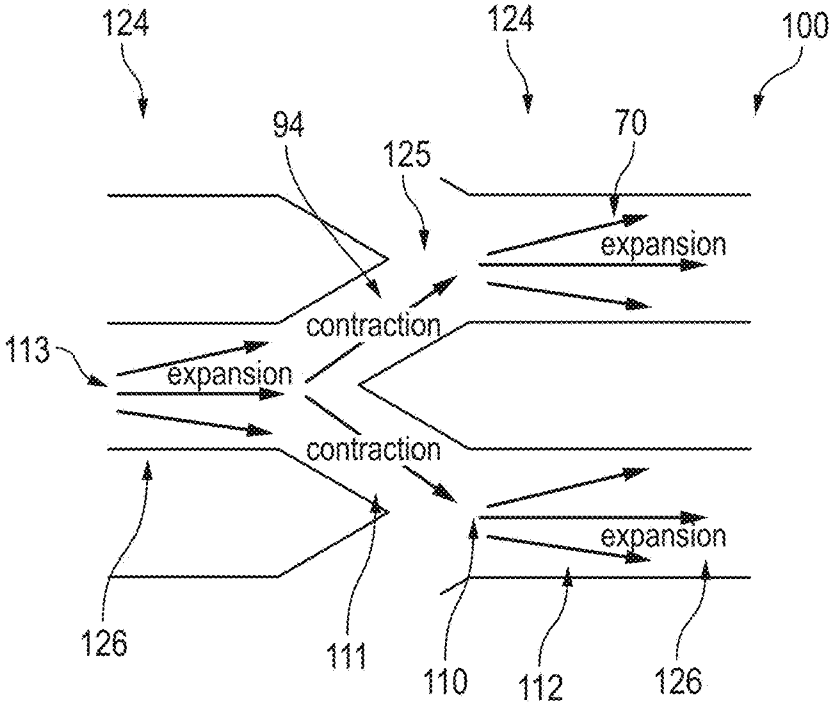
FIG. 8 depicts an enlarged view of the cross section of the linkages or plates of an alternative exemplary embodiment of the cartridge for anti-cavitation and low noise and an alternative exemplary embodiment of a jet stream flowing through the linkages.

In the alternative exemplary embodiment of FIG. 8, the initial flow 113 undergoes contraction 111 as the flow 113 bifurcates into two streams at area 125 between rows 124 of linkages 120. The stream 113 within the area 125 are converging jet streams 94. Then, moving downstream, the flow 113, previously contracted, experiences expansion 112 as it transitions into the area 126 between adjacent linkages 120 in the rows 124. In the expansion phase 112, the stream 113 are non-impinging jet streams 70. In the exemplary embodiment of FIG. 8, the flow area 126 consistently exceeds the combined flow area 125. The flow area 126 remains constant across the trim, while the cumulative flow area 125 gradually expands, leading to a cyclical pattern of expansion phases 112 and contraction phases 111 that results in staged pressure reduction at each subsequent pressure dropping stage 110. The alternative exemplary embodiment of the cartridge 100 of FIG. 8, like the exemplary embodiment of the cartridge 100 in FIG. 7, also facilitates the mixing of jet streams 113 from different flow paths, contributing to the dissipation of additional energy within the valve 10 and/or cartridge 100.

The flow-facing edges 133*a* of the polygonal elements 130 play a crucial role in inducing stream or flow 113 bifurcation, effectively dividing the flow 113 into two distinct paths. These split streams 113 are directed toward the interstitial space or area 126 between the parallel faces 133*b* of adjacent polygonal elements 130, causing the intermixing of the flow streams 113. The frequent alterations in flow 113 direction within this space or area 126 contribute to the dissipation of kinetic energy, resulting in a noticeable reduction in flow 113 velocity. As the flow streams 113 splits into multiple paths will leads to considerable reduction in noise levels.

Within each pressure dropping stage 110 nested within the cartridge 100, there exists an expansion area 112 and contraction area 111. In these zones or pressure dropping stages 110, the fluid 113 experiences both expansion 112 and contraction 111. As the flow 113 expands, the flow 113 pressure diminishes, and conversely, as the flow 113 contracts, some of the flow 113 pressure is recovered. However, the reduction of flow 113 pressure during expansion 112 poses a potential risk of dipping below the vapor pressure of the liquid, giving rise to the formation of bubbles that may implode and induce cavitation during the subsequent pressure recovery in the contraction area 111. This phenomenon is prevented by ensuring precise dimensions for the expansion areas 112 and contraction areas 111 within the cartridge 100, achieved through design calculations and computational fluid domain analysis.

Figure 9:
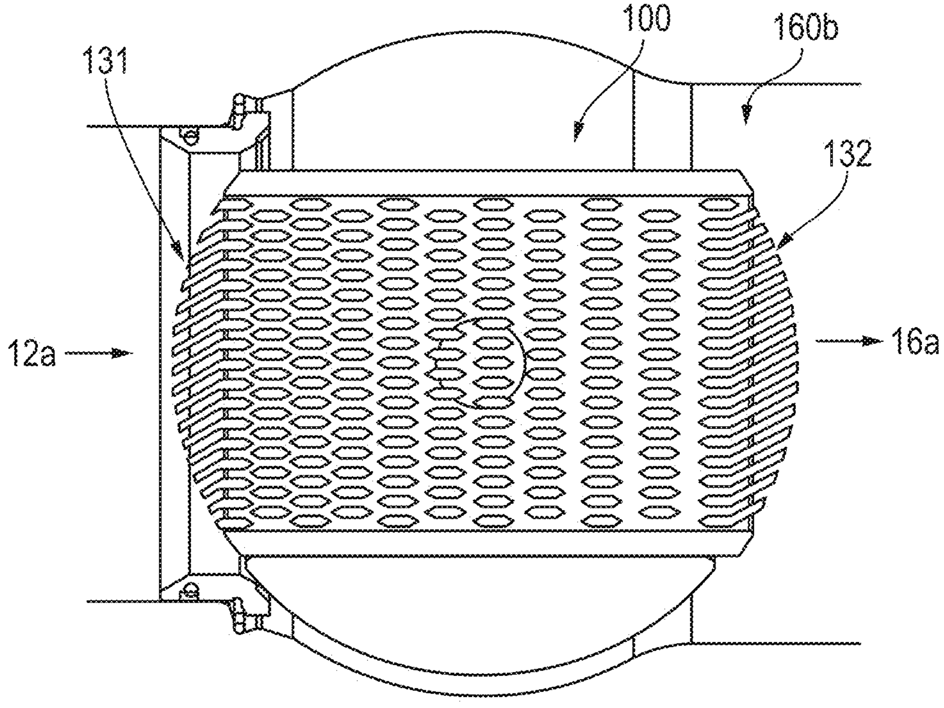
FIG. 9 depicts a top view of the cross section of an exemplary embodiment of a segmented rotary control valve with an alternative exemplary embodiment of a cartridge for anti-cavitation and low noise shown in a fully opened position.
Figure 10:
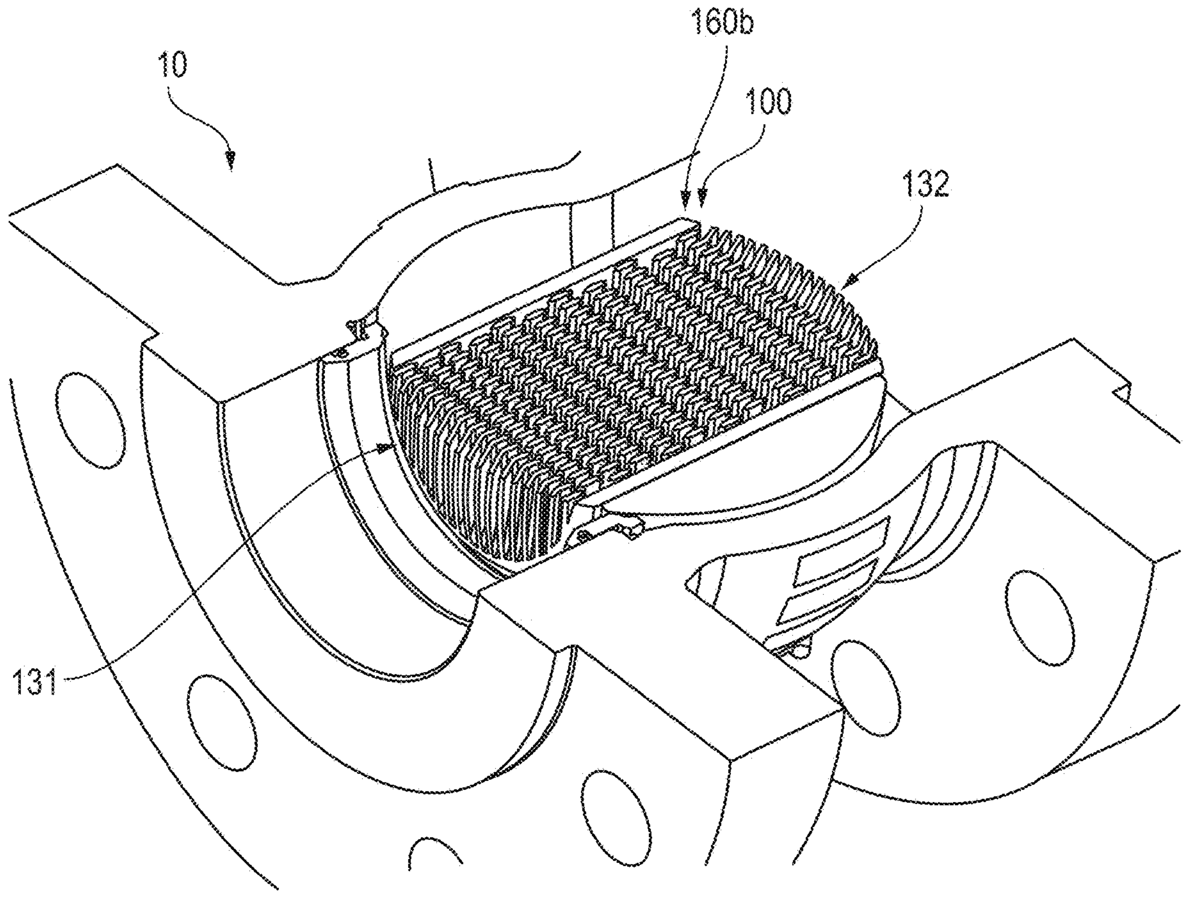
FIG. 10 depicts a perspective view of the cross section of the segmented rotary control valve and the alternative exemplary embodiment of the cartridge for anti-cavitation and low noise as shown in FIG. 9.
Figure 11:
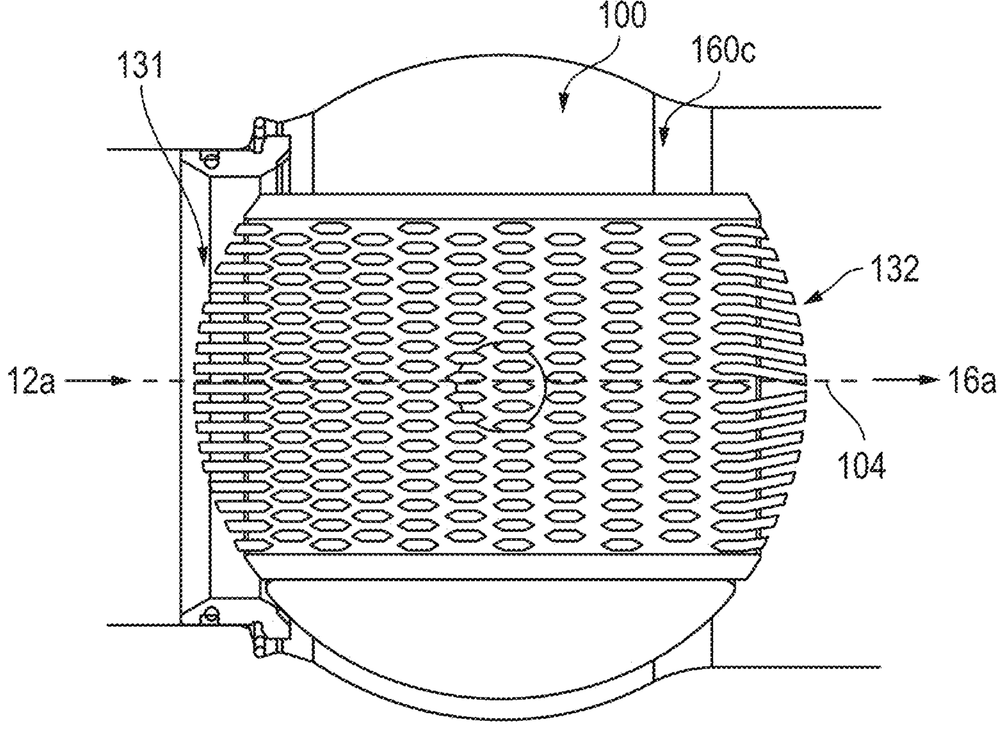
FIG. 11 depicts a top view of the cross section of an exemplary embodiment of a segmented rotary control valve with an alternative exemplary embodiment of a cartridge for anti-cavitation and low noise shown in a fully opened position.
Figure 12:
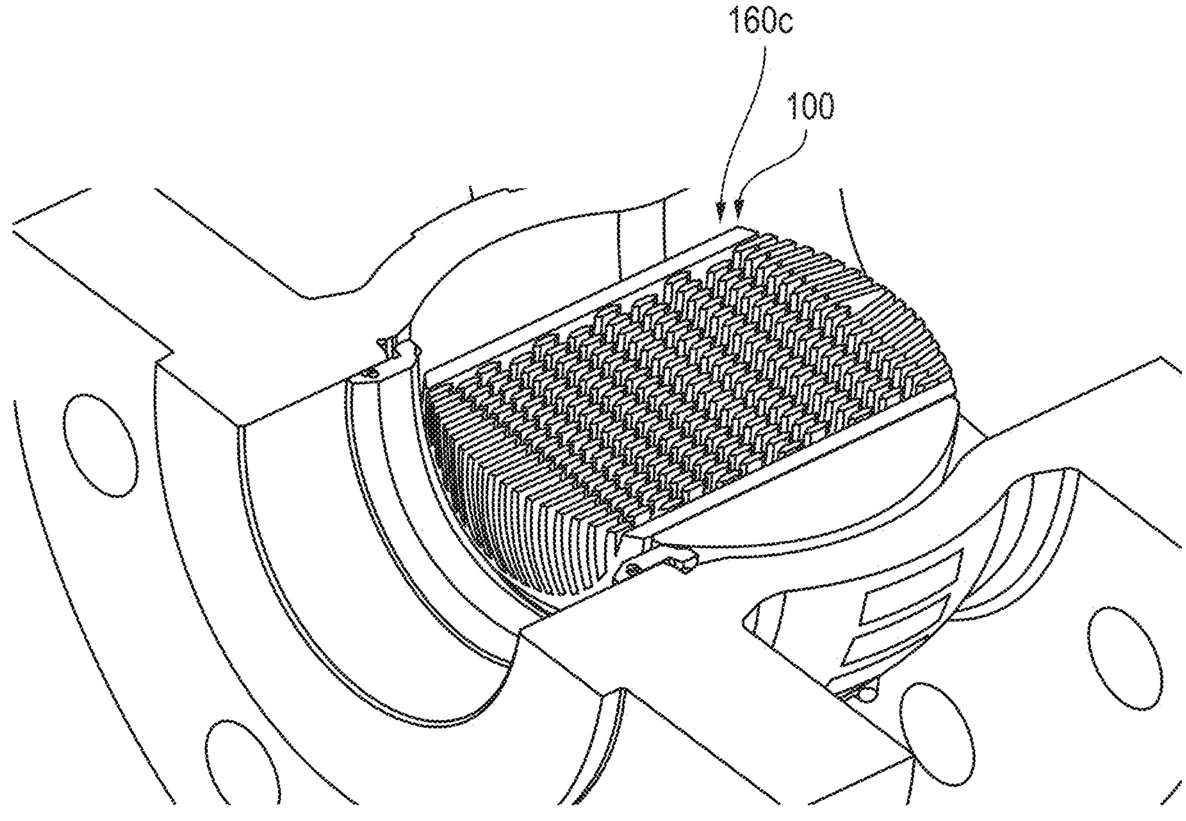
FIG. 12 depicts a perspective view of the cross section of the segmented rotary control valve and the alternative exemplary embodiment of the cartridge for anti-cavitation and low noise as shown in FIG. 11.
Figure 13:
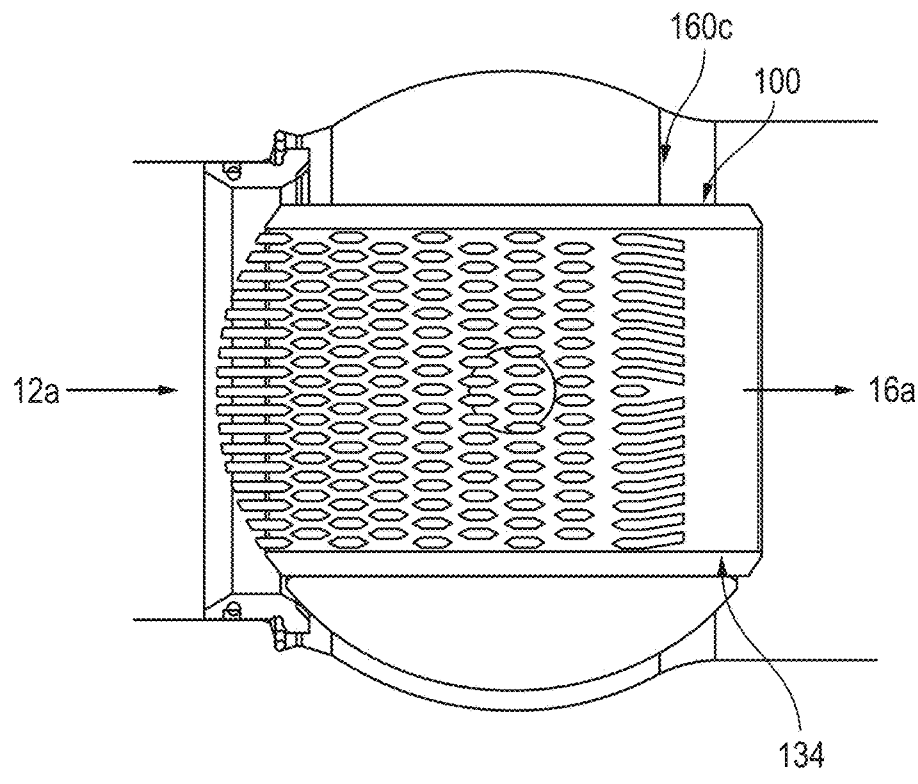
FIG. 13 depicts a top view of the cross section of an exemplary embodiment of a segmented rotary control valve with an alternative exemplary embodiment of a cartridge for anti-cavitation and low noise shown in a fully opened position.
Figure 14:
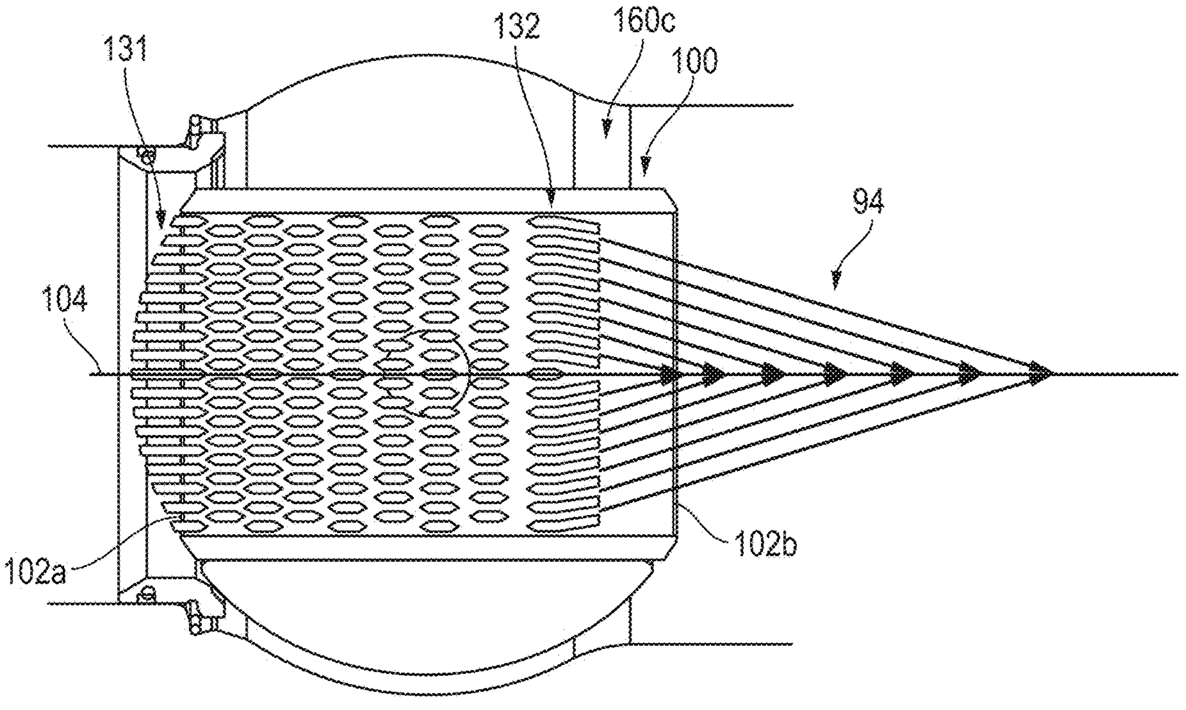
FIG. 14 depicts an enlarged top view of the cross section of the exemplary embodiment of a segmented rotary control valve with the alternative exemplary embodiment of a cartridge for anti-cavitation and low noise as shown in FIG. 13.

An alternative exemplary embodiment of a cartridge 160*b* is illustrated in FIGS. 9-10. The cartridge 160*b* may have the same or similar linkages 120, 120*a* or plates 130 as earlier exemplary cartridge 160*a* (wherein the linkages 120, 120*a* or plates 130 are oriented orthogonal or perpendicular to the flow 113 direction defined from the cartridge upstream end 102*a* to the cartridge downstream end 102*b*). However, the alternative exemplary embodiment of cartridge 160*b* includes one or both of entry plates 131 and exit plates 132 which are angled, which are located at the upstream edge 102*a*, and downstream edge 102*b*, respectively. The entry plates 131 of the cartridge 160*b* are angled so as to facilitate the inward flow 113 into the cartridge 160*b*. The exit plates 132 are angled so as to prevent flow 113 (which may contain potential bubbles or cavitation in said flow 113) from impacting or hitting the valve body 18 upon leaving the cartridge 160*b*. The alternative exemplary embodiment of the cartridge 160*b* provides an advantage particularly in scenarios involving erosive media and operations in low lift conditions.

A further alternative exemplary embodiment of a cartridge 160*c* is illustrated in FIGS. 11-14. The cartridge 160*c* may have the same or similar linkages 120, 120*a* or plates 130 as earlier exemplary cartridges 160*a*-160*b* (wherein the linkages 120, 120*a* or plates 130 are oriented orthogonal or perpendicular to the flow 113 direction defined from the cartridge upstream end 102*a* to the cartridge downstream end 102*b*). However, the alternative exemplary embodiment of cartridge 160*c* includes entry linkages or plates 131 and exit linkages or plates 132, wherein the exit linkages or plates 132 are angled towards a central plane 104 and the entry plates 131 are straight or aligned with the upstream flow direction 12*a* and downstream flow direction 16*a*. The exit plates 132 converge the flow 113, and the entry plates 131 guide the flow 113 into the cartridge 160*c*. The entry plates 131 are located at the upstream edge 102*a* for exemplary embodiments of the cartridge 160*c*; however the exit plates 132 may by optionally located at the downstream edge 102*b* (see, e.g. FIGS. 11-12), or alternatively, within the interior of the cartridge 160*c*, wherein the exit plates 132 terminate at a distance 134 from the downstream edge 102*b* (see, e.g. FIGS. 13-14). The exiting jets 113 of cartridge 160*c* converge toward the central plane 104, serving to safeguard the valve body 18 wall and piping (not shown) in the event of cavitation at the final stage. When the exit linkages or plates 132 are positioned at a distance 134 away from the downstream edge 102*b*, the valve body 18 may be even more or further protected from any potential residual cavitation, as a portion or percentage of any such cavitation would instead resolve or converge within the distance 134 of the cartridge 160*c*, and not hit the valve body 18 upon exit of the cartridge 160*c*.

Figure 15:
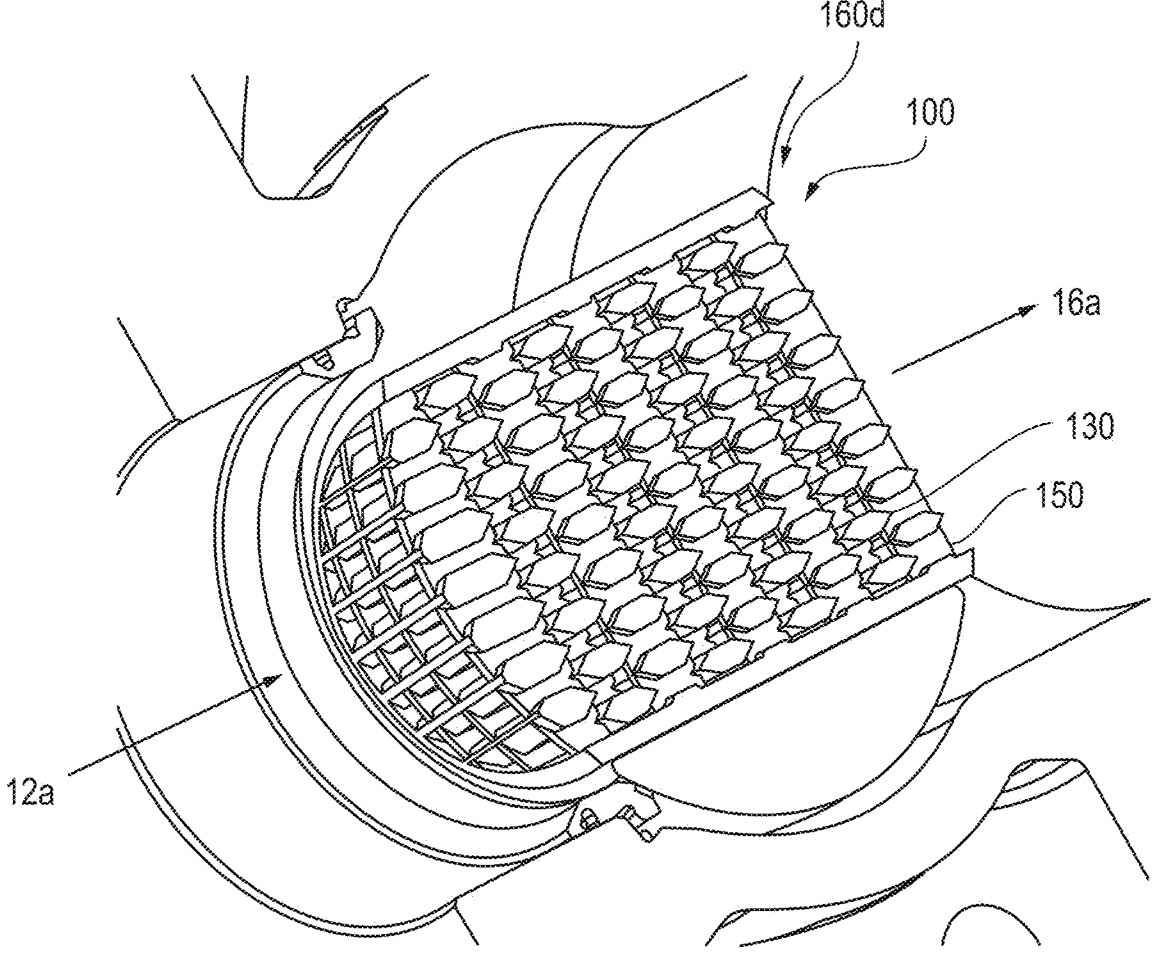
FIG. 15 depicts a top perspective view of a top cross section of an exemplary embodiment of a segmented rotary control valve with an alternative exemplary embodiment of a cartridge for anti-cavitation and low noise shown in a fully opened position.
Figure 16:
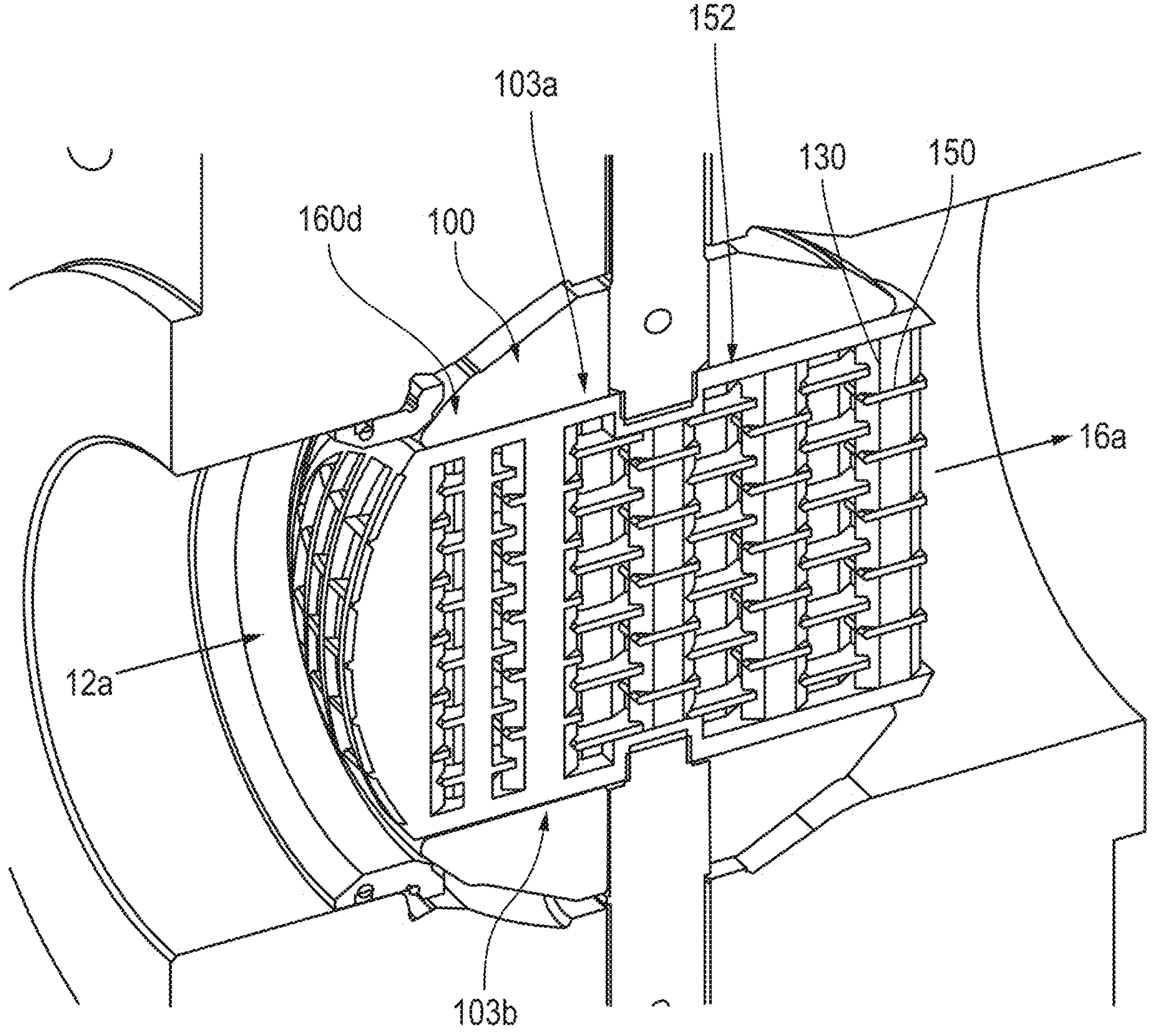
FIG. 16 depicts a front perspective view of a side cross section of the exemplary embodiment of a segmented rotary control valve with the alternative exemplary embodiment of a cartridge for anti-cavitation and low noise as shown in FIG. 15.
Figure 17:
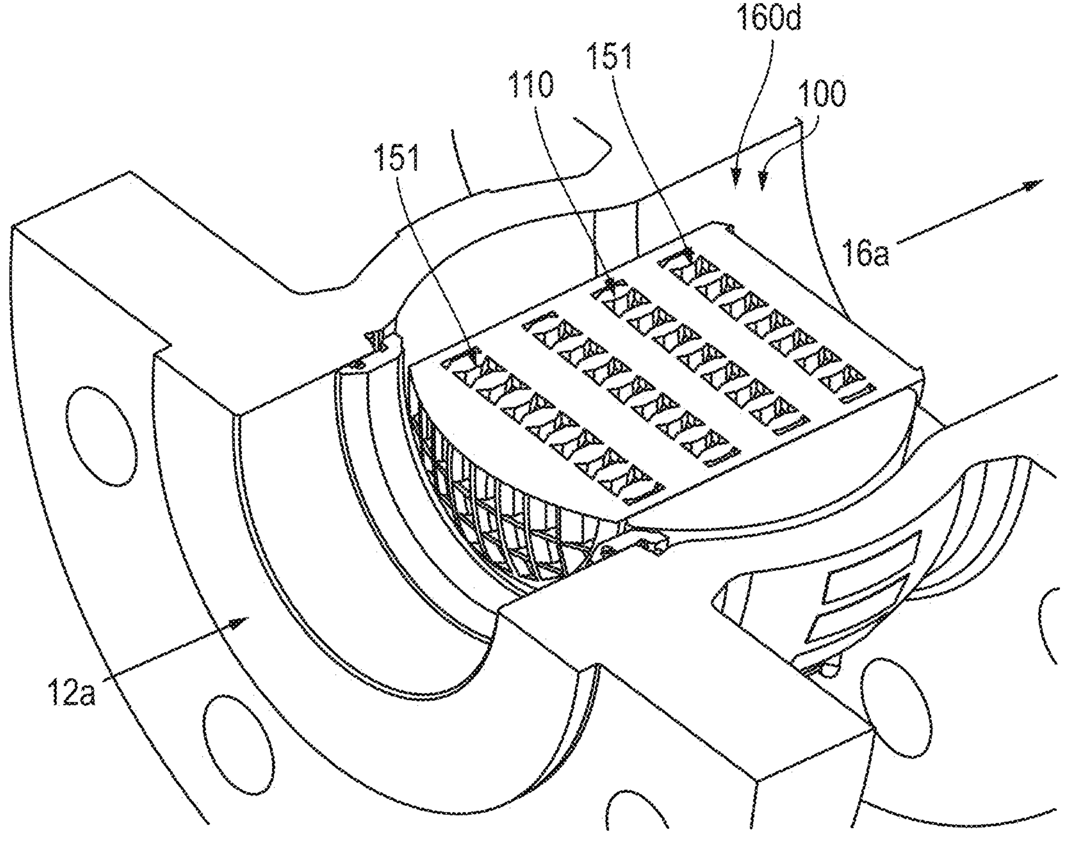
FIG. 17 depicts a different top perspective view of a top cross section of the exemplary embodiment of the segmented rotary control valve with the alternative exemplary embodiment of the cartridge for anti-cavitation and low noise as shown in FIGS. 15-16.

A further alternative exemplary embodiment of a cartridge 160*d* is depicted in FIGS. 15-17. FIGS. 15 and 17 depict different top perspective views of a top cross section of the segmented rotary control valve 10 with cartridge 160*d*; and FIG. 16 depicts a front perspective view of a side cross section of the cartridge 160*d* of FIGS. 15 and 17. The cartridge 160*d* may have the same or similar linkages 120, 120*a* or plates 130 as earlier exemplary cartridges 160*a*-160*c* (wherein the linkages 120, 120*a* or plates 130 are oriented orthogonal or perpendicular to the flow 113 direction defined from the cartridge upstream end 102*a* to the cartridge downstream end 102*b*), and further includes a staggered extensions or protrusions 150 orthogonal to the upstream flow 12*a* and downstream flow 16*a*, and wherein the protrusions 150 are also orthogonal to the linkages 120, 120*a*, or plates 130 and are located or situated on the linkages 120, 120*a*, or plates 130. As can be seen in FIG. 16, the vertical column 152 defined between each staggered row 124 of plates 130 includes staggered protrusions 150 along the vertical length of the plates 130 which connects the top half 103*a* of the cartridge 160*d* to the bottom half 103*b* of the cartridge 160*d*. The protrusions 150 of the downstream or subsequent plates 130 are offset, or unaligned from the protrusions 150 of the upstream or prior plates 130. The vertical column 152 between polygonal links 130 is thus compartmentalized or sectioned via the protrusions 150 into compartments 151 (see FIG. 17), in order to achieve a more effective pressure drop and improve the structural rigidity of the links 120 or plates 130 to handle higher pressure drop. These compartments 151 are offset between adjacent rows 124 or stages 110 in order to strategically and effectively achieve staged and gradual pressure drops (i.e. such as, across a single top or bottom cross section view as showing in FIG. 17, the compartments 151 may appear in every other row 124 of this cross-section). The protrusions 150 are set at a same distance from each other on the plurality of linkages 120 at a downstream end 102*b* of the cartridge body 105 compared to the protrusions 150 on each of the linkages 120 at an upstream end 102*a* of the cartridge body 105. By way of example only, the compartments 151 are strategically organized to force the flow or stream 113 to take a path or turn, by way of example, a 90 degree turn, from one compartment 151 into a subsequent compartment 151 as the flow 113 travels downstream in each stage 110. Further, the compartments 151 may increase in size or area as the compartments 151 approach or near the downstream end 102*b*, as compared with compartments 151 nearer the upstream end 102*a*. The cartridge 160*d* may be able to handle larger pressure drops as compared with other disclosed cartridges herein (such as exemplary embodiments of cartridges 160*a*-160*c*).

Figure 18:
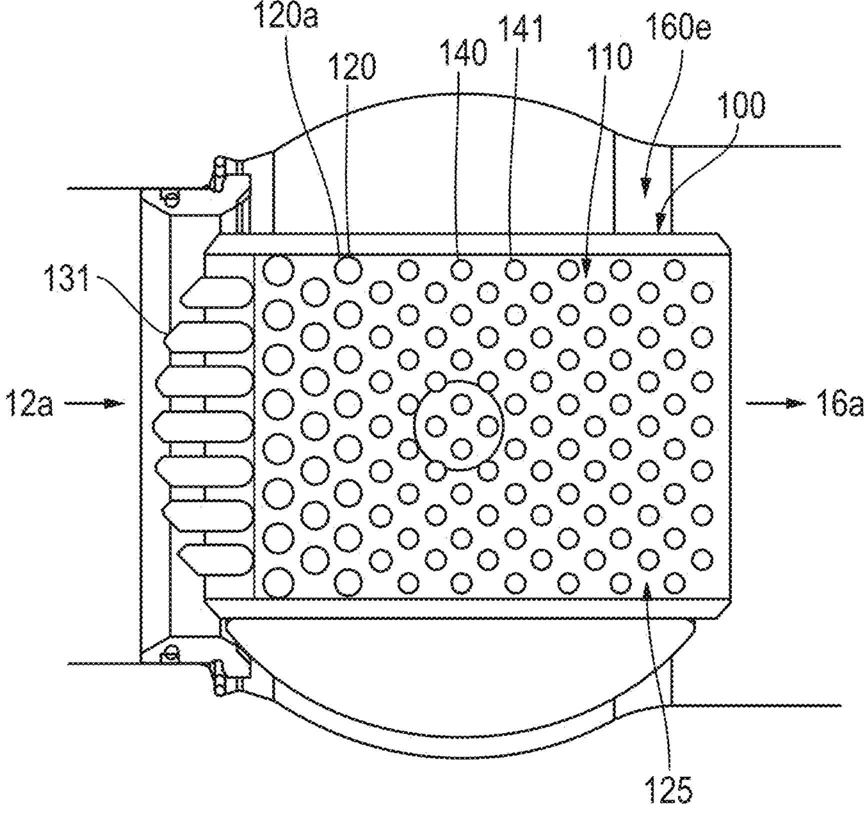
FIG. 18 depicts a top view of the cross section of an exemplary embodiment of a segmented rotary control valve with an alternative exemplary embodiment of a cartridge for anti-cavitation and low noise shown in a fully opened position.
Figure 19:
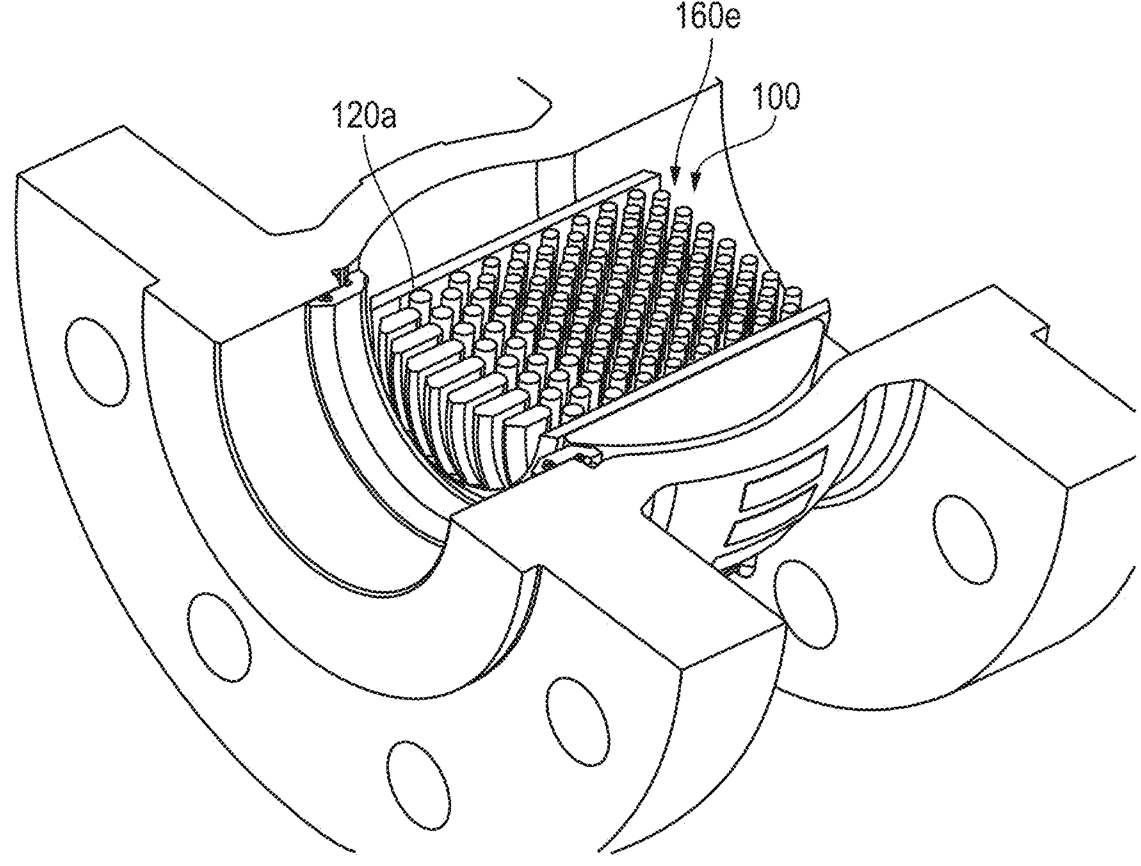
FIG. 19 depicts a perspective view of the cross section of the segmented rotary control valve and the alternative exemplary embodiment of the cartridge for anti-cavitation and low noise as shown in FIG. 18.
Figure 20:
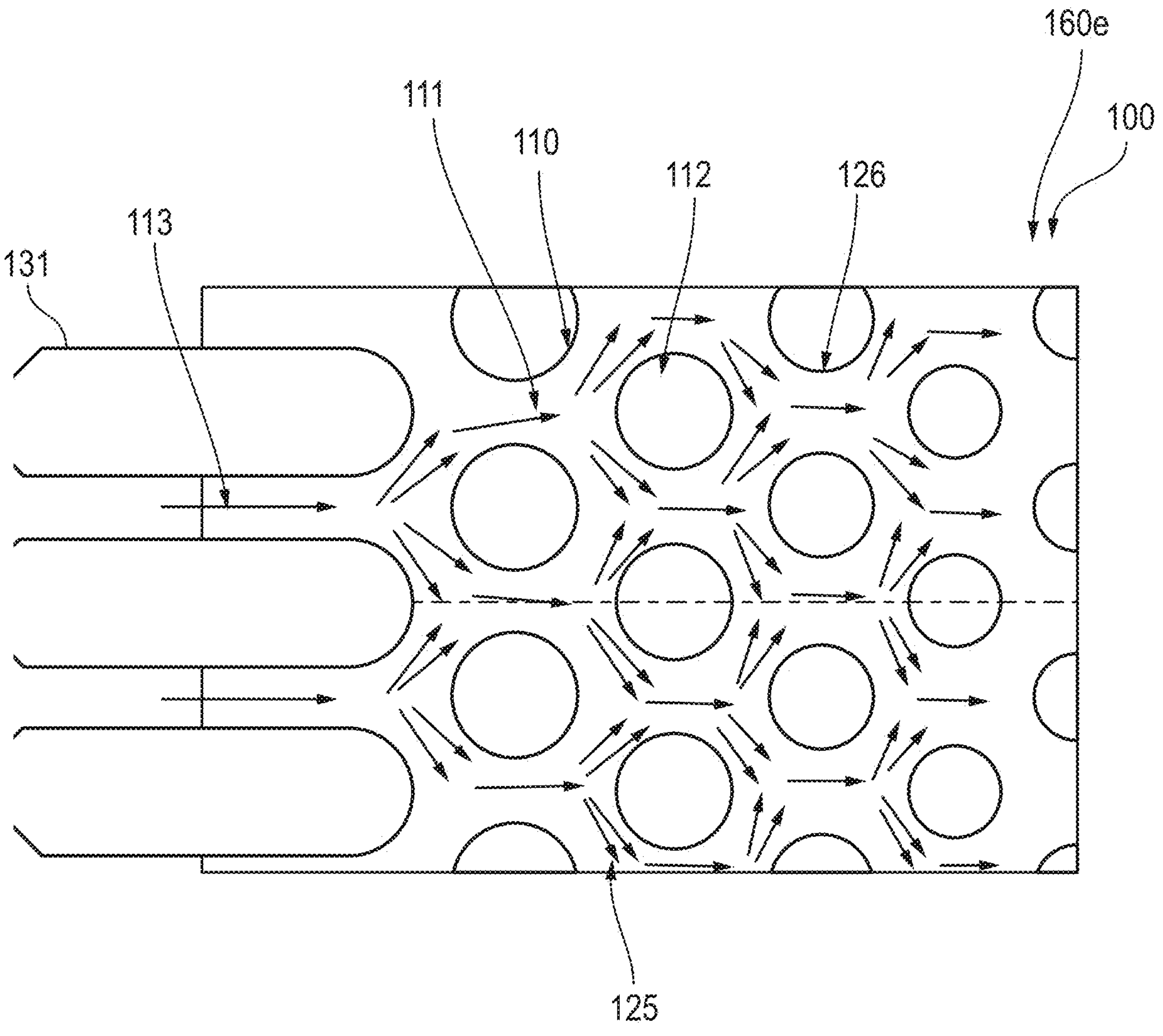
FIG. 20 depicts an enlarged view of the top cross section of the linkages or rods of the exemplary embodiment of the cartridge for anti-cavitation and low noise as shown in FIGS. 18-19.
Figure 21:
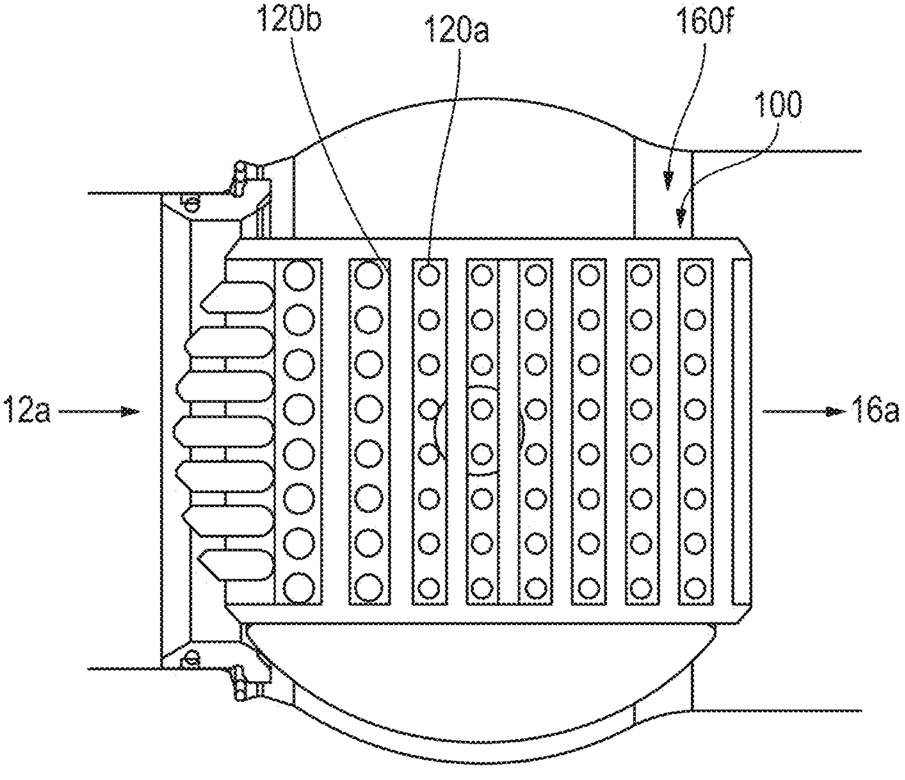
FIG. 21 depicts a top view of the cross section of an exemplary embodiment of a segmented rotary control valve with an alternative exemplary embodiment of a cartridge for anti-cavitation and low noise shown in a fully opened position.
Figure 22:
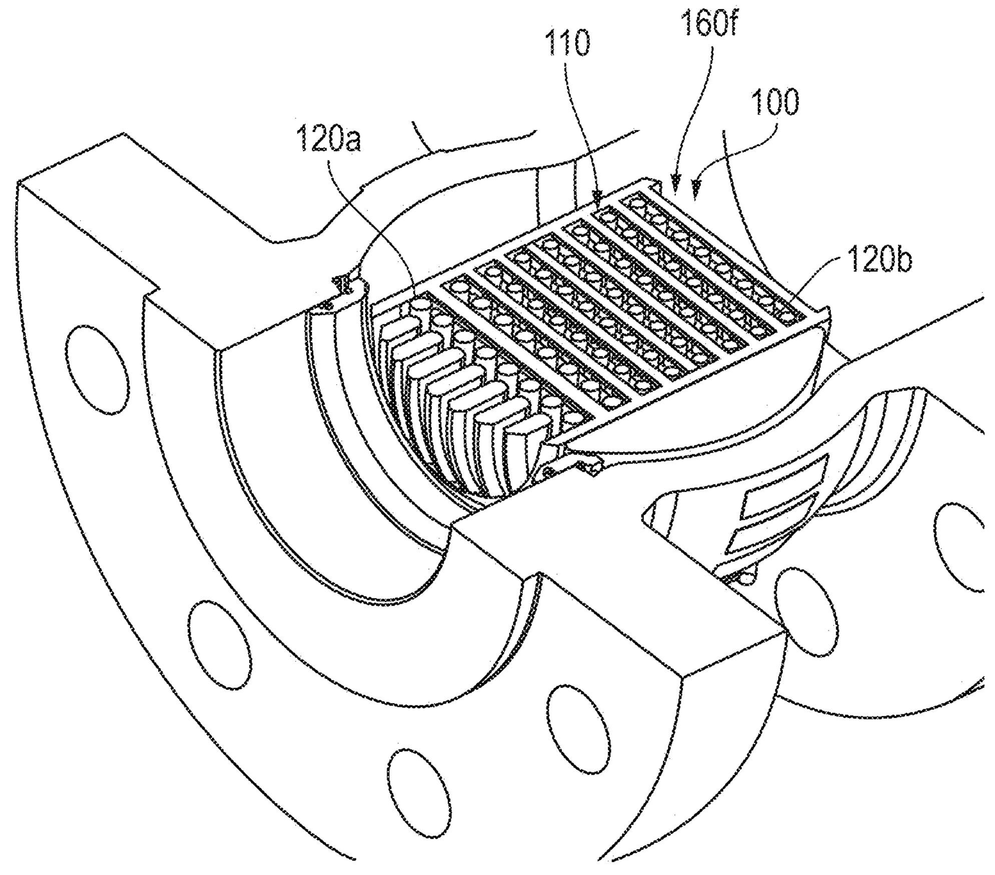
FIG. 22 depicts a perspective view of the cross section of the segmented rotary control valve and the alternative exemplary embodiment of the cartridge for anti-cavitation and low noise as shown in FIG. 20.
Figure 23:
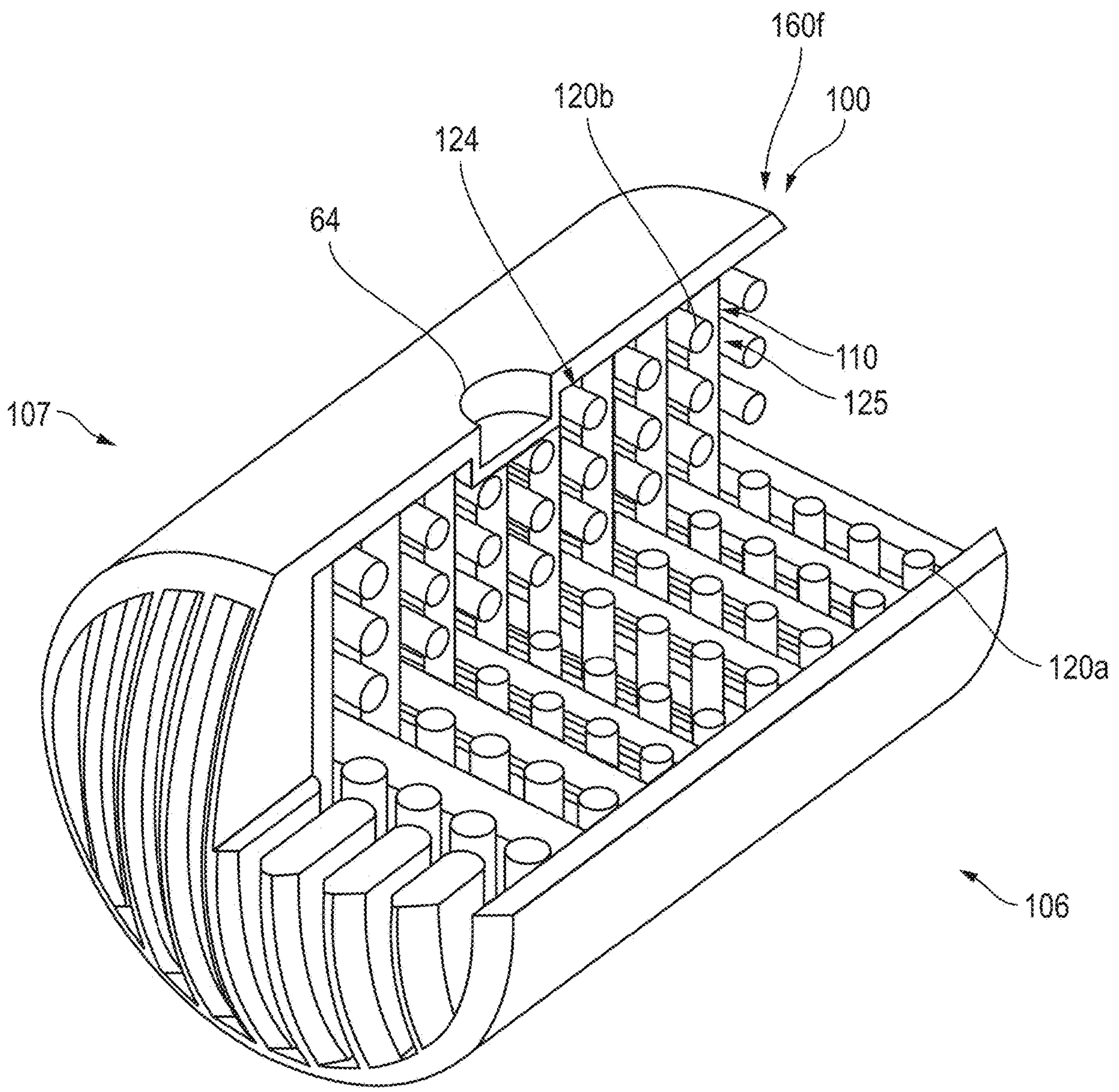
FIG. 23 depicts a perspective view of the alternative exemplary embodiment of the cartridge for anti-cavitation and low noise as shown in FIGS. 20-21, having a partial cross section cut-out of the cartridge.

In a further alternative exemplary embodiment of the anti-cavitation and low-noise cartridge trim 160*e* and as depicted in FIGS. 18-20, rods 140 having a circular cross section 141 are employed inside the cartridge 160*e* instead of polygonal elements or plates 130. This alternative exemplary embodiment of the cartridge 160*e* offers an advantage for fabrication in larger sizes as opposed to utilizing three dimensional (3D) printing, resulting in a cost-effective solution. Somewhat similarly to earlier alternative exemplary embodiments of the cartridge 100 and 160*a*-160*d*, the cartridge 160*e* has linkages 120, 120*a* or rods 140 oriented orthogonal or perpendicular to the flow 113 direction defined from the cartridge upstream end 102*a* to the cartridge downstream end 102*b*, and the rods 140 may optionally decrease in size or cross section 141 towards the downstream end 102*b* of the cartridge 160*e* (if flow area 125 is larger than flow area 126). The rods 140 are also positioned at an offset or unaligned position in each subsequent or downstream row 124 from the prior or upstream row 124 and also induce gradual pressure drop stages 110 similar to as described for earlier cartridge exemplary embodiments 160*a*-160*d* as the flow 113 experiences contraction cycles 111 and expansion cycles 112 traveling through flow areas 125 and flow areas 126. The cartridge 160*e* may optionally include entry plates 131 to guide the flow 113 into the cartridge 160*e* interior and towards the rods 140.

In yet an additional alternative exemplary embodiment of the anti-cavitation and low-noise cartridge trim 160*f*, a first set of linkages 120*a* or rods 140 and a second set of linkages 120*b* or rods 140 are utilized as in the exemplary embodiment of the cartridge 160*e*. The first set of linkages 120, 120*a* are oriented orthogonal or perpendicular to the flow 113 direction defined from the cartridge upstream end 102*a* to the cartridge downstream end 102*b*, as organized into rows or groups 124, wherein the first linkage 120*a* in the row 124 is towards a front 106 of the cartridge 160*f*, and the last linkage 120*a* in the row 124 is towards a rear 107 of the cartridge 160*f*. In the anti-cavitation and low-noise cartridge trim 160*f*, the second set of linkages 120, 120*b* or rods 130 are oriented orthogonal or perpendicular to the first set of linkages 120*a*, and are also oriented orthogonal or perpendicular to the flow 113 direction defined from the cartridge upstream end 102*a* to the cartridge downstream end 102*b*. The second linkages 120*b* are also organized into stacked vertical rows or groups 124, wherein the first linkage 120*b* of the row 124 is towards a top half 103*a* of the cartridge 160*f*, and the last linkage 120*b* of the row 124 is towards the bottom half 103*b* of the cartridge 160*f*. The second set of linkages 120*b* connect a front end 106 of the cartridge 160*f* at one end of a linkage 120*b*, to a rear or back end 107 of the cartridge 160*f* at the second end of the linkage 120*b*. Thus these two sets 120*a*, 120*b* of circular rods 140 are welded together in a crisscross pattern to enhance the efficiency of pressure reduction. The rods 140 of the linkages 120*a* and 120*b* are also positioned at an offset or unaligned position in each subsequent or downstream row 124 from the prior or upstream row 124 and also induce gradual pressure drop stages 110 similar to as described for earlier cartridge exemplary embodiments 160*a*-160*e*. In other words, the linkages 120*a* in each subsequent downstream row 124 are offset, unaligned, or non-parallel from the position of the linkages 120*a* in the prior, upstream row 124. By way of example only, the first of the linkages 120*a* in a downstream or subsequent row 124 may be shifted closer or farther away towards the front 106 than the first of the linkages 120*a* in a prior, upstream, or earlier row 124. Further, the linkages 120*b* in each subsequent downstream row 124 are offset, unaligned, or non-parallel from the position of the linkages 120*b* in the prior, upstream row 124. By way of example only, the first of the linkages 120*b* in a downstream or subsequent row 124 may be shifted closer or farther away towards the top 103*a* than the first of the linkages 120*b* in a prior, upstream, or earlier row 124. The alternative exemplary embodiment of the cartridge trim 160*f* offers significant benefits, especially when applied to larger sized systems. The flow 113 experiences deliberate changes in direction along two perpendicular planes as it progresses from one stage 110 to the next downstream stage 110. The alternative exemplary embodiment of cartridge 160*f* proves advantageous for fabrication in larger sizes, providing a more effective means of inducing pressure drop while optimizing fluid 113 flow through controlled directional changes. The first set of linkages 120*a* and second set of linkages 120*b* may optionally both decrease in size or cross section 141 towards the downstream end 102*b* of the cartridge 160*f* if the flow area 125 is larger than flow area 126 for each set of linkages 120*a*, 120*b*. The cartridge 160*f* may optionally include entry plates 131 to guide the flow 113 into the cartridge 160*f* interior and towards the rods 140.

Figure 24:
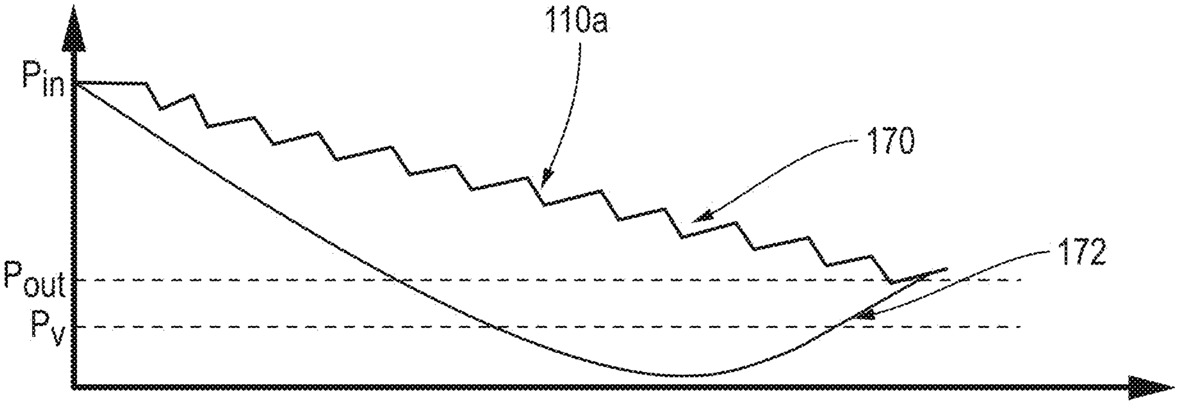
FIG. 24 depicts a graph comparing the pressure of an exemplary fluid flow in a segmented rotary control valve with an exemplary embodiment of a cartridge trim for anti-cavitation and low noise, and a fluid flow for a conventional or commercially available segmented rotary control valve.

FIG. 24 depicts a graph comparing the pressure of an exemplary fluid flow 113 in a segmented rotary control valve 10 having an exemplary embodiment of a cartridge trim 100 for anti-cavitation and low noise, and a fluid flow for a conventional or commercially available segmented rotary control valve. In the FIG. 24 the vertical axis or y-axis of the graph represents the pressure of the liquid, wherein Pin represents the pressure of the liquid as it enters into the segmented rotary control valve, Pout represents the pressure of the liquid as it exits into the segmented rotary control valve, and $P_v$ represents the vapor pressure of the liquid. The horizontal axis or x-axis of graph represents the distance between the inlet port 26*c* and outlet port 26*d* of the valve 10. The stepped line 170 of the graph shows an exemplary embodiment of the progression of the pressure of the fluid 113 as the fluid 113 travels through the segmented rotary control valve 10 having an anti-cavitation and low noise cartridge trim 100 and/or 160*a*-160*f*. The curved line 172 of the graph shows the progression of the pressure of a fluid as the fluid travels through a segmented rotary control valve without any anti-cavitation and low noise cartridge trim 100 or 160*a*-160*f*. As can be seen in comparing the stepped line 170 to the curved line 172, usage of the anti-cavitation and low noise cartridge trim 100 and/or 160*a*-160*f* prevents the pressure of the fluid 113 from ever dropping below the vapor pressure or $P_v$, of the fluid, thus eliminating or mitigating the potential for cavitation or bubbles within the fluid 113 for the segmented rotary control valve 10 or segmented ball valve 10*a*. Conversely, for the curved line 172 for the conventional ball valve, without the trim 100 as disclosed herein, the pressure of the fluid can drop significantly below the vapor pressure of the fluid or liquid, thus introducing damaging cavitation or bubbles into the fluid, which can damage the valve system. The effects of the pressure drop stages 110 in the above described exemplary embodiments of the cartridges 100 and 160*a*-160*f* can also be visualized with each step 110*a* in the pressure graph as seen in FIG. 24. Each pressure drop 110 causes the pressure of the fluid 113 in the stepped graph 170 to decrease by a gradual step 110*a*. As can be seen by the number of steps 110*a* in FIG. 24, there are twelve (12) pressure stages 110 in the exemplary embodiment of the cartridge 100 used in FIG. 24. As described earlier, the disclosure herein can encompass more or less pressure drop stages 110 as desired. The gradually, stepped decrease of the pressure of the fluid 113 helps prevent the fluid 113 from dropping below the vapor pressure of said fluid 113.

Figure 25:
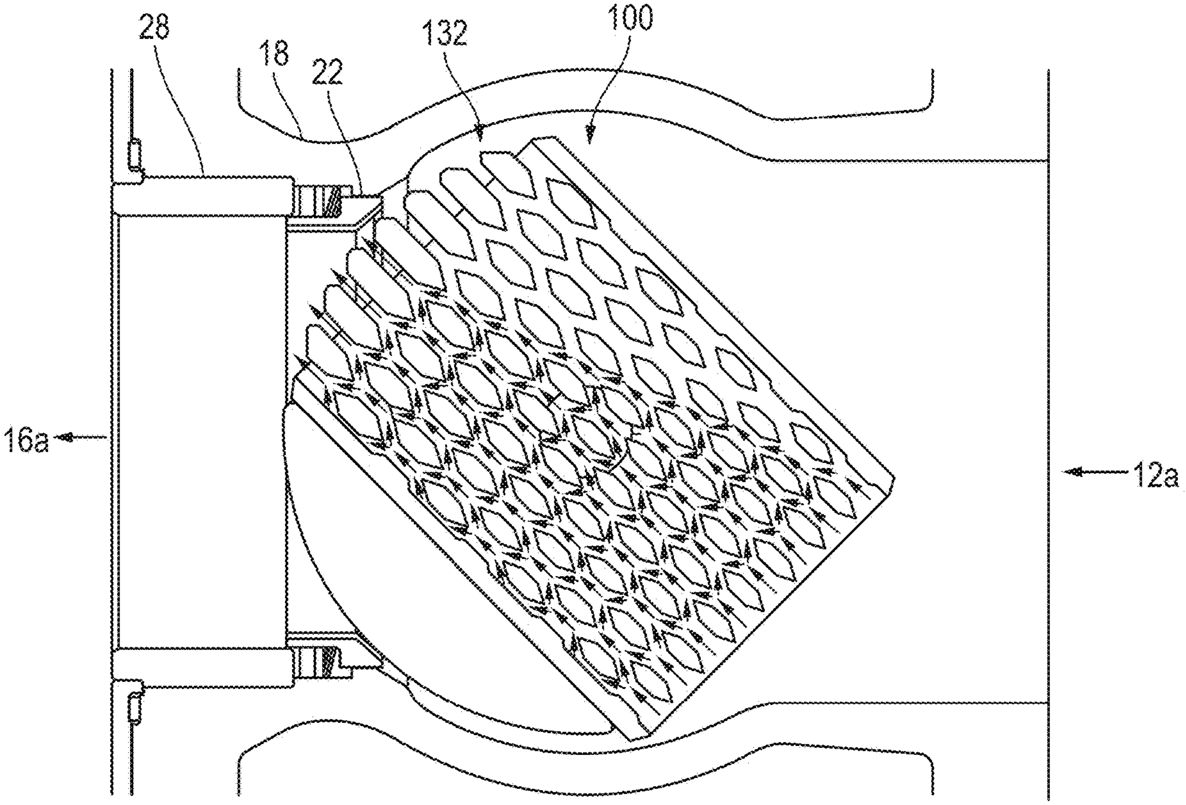
FIG. 25 depicts a top view of the cross section of an alternative exemplary embodiment of a segmented rotary control valve with an exemplary embodiment of a cartridge for anti-cavitation and low noise shown in one modulating or partially opened position in a shaft upstream direction with an exemplary embodiment of a hardened liner.

FIG. 25 depicts a top view of the cross section of an exemplary embodiment of a segmented rotary control valve 10 with an exemplary embodiment of a cartridge trim 100 for anti-cavitation and low noise shown in one modulating or partially opened position in a shaft upstream 12*a* direction (or reverse flow) with an exemplary embodiment of a hardened liner 28 on the valve body 18, wherein the liner 28 may be adjacent to a downstream 16*a* valve seat 22, at the downstream 16*a* position or exit of the valve body 18 or cartridge 100. The anti-cavitation low-noise cartridge 100 is designed for use in the shaft upstream 12*a* flow direction as well, as shown in FIG. 25. While the cavitation trim 100 is intended to eliminate cavitation, cavitation can still occur in the final stage in certain scenarios. In the event of cavitation at the cartridge 100 exit, a hardened material liner 28 protects the valve's 10 downstream 16*a* side, ensuring that downstream 16*a* components remain safeguarded from potential damage. This reverse flow configuration (or shaft upstream direction) of the cavitation trim 100 prevents high velocity clearance flow near the exit plate 132 edges, a potential issue in the shaft downstream configuration (a shaft downstream configuration is shown, by way of example, in FIG. 3), and helps protect the valve body 18 from damage. The potential issue of clearance flow in the shaft downstream configuration in FIG. 3 may be overcome by reversing flow to the shaft upstream direction or configuration as shown in FIG. 25. In the alternative exemplary embodiment as depicted in FIG. 25, the number of linkages may decrease or be the same or increase across rows 124, or alternatively, the number of intermixing areas may decrease or be the same or increase across the rows 124, as the flow moves from the right to the left of the FIG. 25 (or upstream 12*a* to downstream 16*a*).

While a segmented ball valve 10*a* has been illustrated as an exemplary embodiment, and any type of rotary control valve 10 may be implement the improvements and features as discussed.

While the exemplary embodiments are described with reference to various implementations and exploitations, it will be understood that these exemplary embodiments are illustrative and that the scope of the inventive subject matter is not limited to them. Many variations, modifications, additions and improvements are possible. The teachings and disclosures of the following are hereby intended to be incorporated by reference in their entireties: U.S. patent application Ser. No. 18/358,648 entitled "Low Noise and Anti-Cavitation Rotary Control Valve" as filed Jul. 25, 2023; and U.S. Provisional Patent Application No. 63/39,2301 entitled "Low Noise and Anti-Cavitation Rotary Control Valve" as filed Jul. 26, 2022.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

The invention claimed is:

1. A segmented ball for reducing noise and cavitation for a media flow having a flow direction from upstream to downstream in a rotary control valve, comprising a cartridge body replaceably inserted into the segmented ball;

a first plurality of linkages arranged into a plurality of rows of linkages, wherein each of the first plurality of linkages connects a top half of the cartridge body to a bottom half of the cartridge body, and wherein the each of the first plurality of linkages is orthogonal to a longitudinal axis of the cartridge; and wherein each of the plurality of rows of linkages within the cartridge body is offset from an adjacent downstream row of linkages within the cartridge body.

2. The apparatus of claim 1 further comprising a first flow area defined between each of the plurality of rows of linkages; and a second flow area defined between each of linkages within the adjacent downstream row of linkages, and wherein the first flow area is of a different size than the second flow area.

3. The apparatus of claim 2, wherein the first flow area is larger than the second flow area.

4. The apparatus of claim 2, wherein the first flow area is smaller than the second flow area.

5. The apparatus of claim 4, wherein a first cross section of each linkage of the plurality of the rows of linkages is identical in size to a second cross section of each linkage of the adjacent downstream row of linkages.

6. The apparatus of claim 2, wherein each of the first plurality of linkages further comprises a plurality of protrusions orthogonal to and on each of the first plurality of linkages.

7. The apparatus of claim 6, wherein the plurality of protrusions are set at a same distance from each other on each of the first plurality of linkages at a downstream end of the cartridge body compared to the plurality of protrusions on each of the first plurality of linkages at an upstream end of the cartridge body.

8. The apparatus of claim 7, further comprising a plurality of offset compartments defined by the first plurality of linkages and the plurality of protrusions.

9. The apparatus of claim 2, wherein a first cross section of each linkage of the plurality of the rows of linkages is larger in area than a second cross section of each linkage of the adjacent downstream row of linkages.

10. The apparatus of claim 9, wherein the first cross section and second cross section each comprise a polygon shape defining a flow facing edge configured to bifurcate the media flow at the flow facing edge.

11. The apparatus of claim 9, wherein the first cross section and second cross section each comprise a circular shape configured to bifurcate the media flow at an upstream end of the circular shape.

12. The apparatus of claim 11, further comprising a second plurality of linkages connecting a front of the cartridge to a rear of the cartridge, wherein the second plurality of linkages is orthogonal to the longitudinal axis of the cartridge and also orthogonal to the first plurality of linkages.

13. The apparatus of claim 9, further comprising entry plates on an upstream end of the cartridge body.

14. The apparatus according to claim 13, further comprising exit plates towards a downstream end of the cartridge body.

15. The apparatus of claim 14 wherein the entry plates and exit plates are angled in order to guide the media flow.

16. The apparatus of claim 15, wherein the exit plates are angled to converge the media flow towards a central plane.

17. The apparatus of claim 16, wherein the exit plates terminate a distance from the downstream end of the cartridge body and within the cartridge body.

18. A method for obtaining a gradual pressure drop in a rotary control valve, comprising the steps of:

providing a segmented ball;

inserting a cartridge into a closely fitting internal cavity defined within the segmented ball; and wherein the cartridge comprises a plurality of linkages orthogonal to a flow direction of the rotary control valve in a fully opened position;

wherein the plurality of linkages is arranged into a plurality of rows of linkages;

wherein each of the plurality of row of linkages is offset from a downstream row of linkages; and inducing a pressure dropping stage between each of the plurality of rows of linkages.

19. The method of claim 18 further comprising the steps of expanding a fluid flow and contracting the fluid flow within the pressure dropping stage.

20. The method of claim 19, further comprising the step of preventing a pressure of the fluid flow from dropping below a vapor pressure of the fluid flow.

21. The method of claim 20, further comprising the step of contracting the fluid flow between the each of the plurality of linkages.

22. The method of claim 20, further comprising the step of expanding the fluid flow between each of the plurality of linkages.

23. The method of claim 20, further comprising the step of replacing the cartridge without replacing the segmented ball.

24. A cartridge trim for closely fitting, removing, and replacing within a segmented ball of a rotary valve, having an upstream end and a downstream end, and a top half for connecting to a top stem, and a bottom half for connecting to a bottom stem, and configured for reducing and mitigating noise and cavitation of a fluid flow, comprising a first set of rows of linkages extending from the top half to the bottom half within the cartridge;

wherein each subsequent downstream row of the first set of rows of linkages comprises linkages of decreasing size compared to each prior row of the first set of rows of linkages; and each subsequent downstream row of the first set of rows of linkages is offset from the prior row the first set of rows of linkages via displacement from a front of the cartridge.

25. The apparatus of claim 24, wherein a first row of the first set of rows of linkages is nearer the upstream end and a last row of the first set of rows of linkages is nearer the downstream end.

26. The apparatus of claim 25, wherein the cartridge defines a flow area at the upstream end and a flow area at the downstream end, and wherein the flow area at the downstream end is greater than the upstream end.

27. The apparatus of claim 26, wherein the flow area at the upstream end is defined by an area around the first set of rows of linkages at the upstream end and between the linkages of the first set of rows of linkages at the upstream end; and wherein the flow area at the downstream end is defined by an area around the first set of rows of linkages at the downstream end and between the linkages of the first set of rows of linkages at the downstream end.

28. The apparatus of claim 27, further comprising a second set of rows of linkages extending from a front of the cartridge to a rear of the cartridge, wherein the second set of rows of linkages is orthogonal to the first set of rows of linkages and also orthogonal to the fluid flow when the cartridge is in a fully opened position.

* * * * *